PROGRAMMABLE TELEMETRY SYSTEM

Filed Aug. 20, 1968 4 Sheets-Sheet 1

INVENTORS,
MARVIN S. MAXWELL
PAUL M. FEINBERG
EUGENE A. CZARCINSKI
JOSEPH R. SILVERMAN
JOHN G. LESKO, JR.
BY
Carl Levy
ATTORNEYS Dec. 8, 1970 M. S. MAXWELL ET AL 3,546,684

PROGRAMMABLE TELEMETRY SYSTEM

Filed Aug. 20, 1968

4 Sheets-Sheet 2

INVENTORS,
MARVIN S. MAXWELL
PAUL M. FEINBERG
EUGENE A. CZARCINSKI
JOSEPH R. SILVERMAN
JOHN G. LESKO, JR.

BY

Carl Levy

ATTORNEYS

INVENTORS,
MARVIN S. MAXWELL
PAUL M. FEINBERG
EUGENE A. CZARCINSKI
JOSEPH R. SILVERMAN
JOHN G. LESKO, JR.
BY
ATTORNEYS

PROGRAMMABLE TELEMETRY SYSTEM

INVENTORS,
MARVIN S. MAXWELL
PAUL M. FEINBERG
EUGENE A. CZARCINSKI
JOSEPH R. SILVERMAN
JOHN G. LESKO, JR.
BY
Earl Levy
ATTORNEYS United States Patent Office 3,546,684
Patented Dec. 8, 1970

3,546,684

PROGRAMMABLE TELEMETRY SYSTEM

Marvin S. Maxwell, Silver Spring, Paul M. Feinberg, Rockville, Eugene A. Czarcinski, Bowie, Joseph R. Silverman, Silver Spring, and John G. Lesko, Jr., Cheverly, Md., assignors to the United States of America as represented by the Administrator of the National Aeronautics and Space Administration Filed Aug. 20, 1968, Ser. No. 754,055
Int. Cl. G06f *3/00;* H04q *7/00*
U.S. Cl. 340—172.5 49 Claims

ABSTRACT OF THE DISCLOSURE

A telemetry data controller includes a switch for time division multiplexing a plurality of analog and digital inputs to a transmitter. The switch is under the control of a programmable, computer type memory, certain portions of which can be changed at will. The memory controls the switches so that different data sources can be sampled at different rates. The analog signals are fed to an analog-to-digital converter, whereby all transmission is of digital signals.

The invention described herein was made by employees of the United States Government and may be manufactured and used by or for the Government for governmental purposes without the payment of any royalties thereon or therefor.

The present invention relates generally to telemetry transmission systems and, more particularly, to a time division multiplexed telemetry transmitting system controlled by a programmed memory.

Time division multiplexed telemetry controllers are generally characterized by a switch which sequentially couples data from a plurality of sources to a single output line. Generally, the switch is activated in an invariable manner, whereby each of the data sources is sampled at a constant rate. If data from a particular source should become unimportant, because, for example, the source is malfunctioning or becomes of a lesser degree of significance than was assumed on an a priori basis, there is no provision usually included for decoupling the source from the telemetry transmitter or for changing the source sampling rate.

In accordance with the present invention, there is provided a time division multiplexed telemetry transmitter wherein data sources being sampled can be changed at will and the source sampling rate can be varied. In addition, different data sources can be examined at different rates, depending upon the importance and frequency variations of a particular source.

The present invention achieves these results by employing a programmable, computer type memory for selectively activating a switch coupled between a plurality of data sources and a transmitter. The programmable, computer type memory sequentially derives data indicative of which source is to be connected to the transmitter. The memory data closes one of a plurality of switches connecting all of the data sources to the transmitter.

To provide different sampling rates for the various signal sources, the memory is sequenced through a multiplicity of minor frames, which together form a major frame. During each memory frame from the memory is activated to derive a plurality of sequential words. Each word includes a number of bits causing the system to execute one of a number of commands and many of them include bits enabling the same multiplexed switches to be sequentially activated at the same time slot during each minor frame. Other switches are sequentially activated at a rate that is a submultiple of a minor frame, i.e., less than once per minor frame, by subcommutated memory sequences. The subcommutated sequences are derived from memory in conjunction with scratch pad memory counters. In a first type of subcommutated sequence, the scratch pad counters derive words indicative of consecutively numbered time division multiplexed switches. The scratch pad counters, in a second kind of subcommutated sequence, derive words indicative of consecutively numbered memory addresses, where there are stored data indicative of different switch numbers. Hence, the first and second types of sequences are respectively denominated as sequential and arbitrary subcommutated sequences. Through the proper use of the subcommutated and minor frame sequences, a relatively small memory can be utilized to generate a lengthy nonrepetitious major frame.

A further feature of the invention is that one of many different stored programs can be selected at will from a station remote from the telemetry transmitter.

Another aspect of the invention is that synchronism between a clock source external to the present system and the memory readout is checked once per major frame. If the clock source and memory readout are not synchronous, the memory readout is halted until the occurrence of a synchronizing clock pulse. Thereby, data sources controlled by the clock source are maintained in time with the memory readout.

A further feature of the invention resides in the checking operations thereof. In particular, the contents of the memory are automatically read out a predetermined number of times after the memory has been reprogrammed to enable a station remote from the telemetering transmitter system to compare the actual memory contents with the desired contents. In addition to the verification of memory contents achieved automatically after the memory has been reprogrammed, the memory can be read out at will in response to a command derived from a station remote from the telemetering transmitter system.

A further feature of the invention relates to checking the operation of the system logic, as well as ascertaining if the memory contents are correct. To check if the memory is functioning in conjunction with the logic network correctly, the memory contents can be read out in the same manner as they are read out during a normal operating cycle in response to a control signal from a station remote from the telemetry transmitting system. With the memory operating in the normal manner while the system is in the checking mode, command data derived by the memory are fed to the telemetry transmitter and relayed back to the station remote from the telemetry transmitting system, without sampling any of the data sources. Thereby, at the remote station, it is possible to check the complete operation of the telemetry transmitter system to see if it conforms with the desired operation. By checking both the memory contents and the memory contents in combination with the logic network of the telemetry transmitter system, malfunctions in the different segments of the telemetry transmitting system can be isolated.

It is, accordingly, an object of the present invention to provide a new and improved telemetry transmitter system.

Another object of the present invention is to provide a new and improved telemetry transmitter system wherein a time division multiplexing sampling sequence can be varied at will.

A further object of the present invention is to provide a new and improved telemetry transmitter system wherein different data sources are sampled at different rates.

An additional object of the present invention is to provide a telemetry controller wherein the sequence of time division signal sampling can be varied at will and different sources can be sampled at different frequencies.

A further object of the present invention is to provide a time division multiplexed telemetry transmitter system including a programmable computer type memory for controlling the sampling of data from a multiplicity of sources.

Still another object of the present invention is to provide a time division multiplexed controller wherein there are established a basic sampling rate for a majority of the data sources and a further sampling rate, that is a submultiple of the basic rate, for the other sources.

Yet an additional object of the invention is to provide a telemetry transmitting system including new and improved means for checking the system operation.

Still a further object of the invention is to provide a telemetry controller including a programmable computer type memory wherein the memory contents can be verified.

Yet another object of the invention is to provide a telemetry controller including a computer type memory that can be reloaded, wherein verification of the data loaded into the memory is accomplished automatically after the reloading operation has occurred.

Still an additional object of the invention is to provide a telemetry controller including a computer type memory that can be reloaded, whereby verification of the data loaded into the memory is accomplished automatically after the reloading operation has occurred or the memory contents can be examined at will in response to a signal derived from a station remote from the telemetry transmitter system.

Still another object of the invention is to provide a new and improved telemetry controller wherein sources of error can be isolated.

Yet another object of the invention is to provide a telemetry controller including a programmable, computer type memory in combination with a logic network, wherein malfunction in the logic network can be detected.

An additional object of the invention is to provide a telemetry system controlled by a memory including a plurality of programs, selectively activated at will, for enabling data sources to be sampled in a multiplicity of different sequences.

A further object of the invention is to provide a program controlled telemetry system wherein synchronism between the program sequence and an external clock source is checked and maintained.

The above and still further objects, features and advantages of the present invention will become apparent upon consideration of the following detailed description of one specific embodiment thereof, especially when taken in conjunction with the accompanying drawings, wherein.

The present invention is described specifically in conjunction with a telemetering system to be employed on the Nimbus D artificial earth satellite and as such the disclosure includes several aspects that may be unique to the capabilities of that space vehicle. It is to be understood, however, that the teachings of the invention are applicable to other systems for telemetering data between a first site and one or more receiving and/or command sites.

Figure 1:
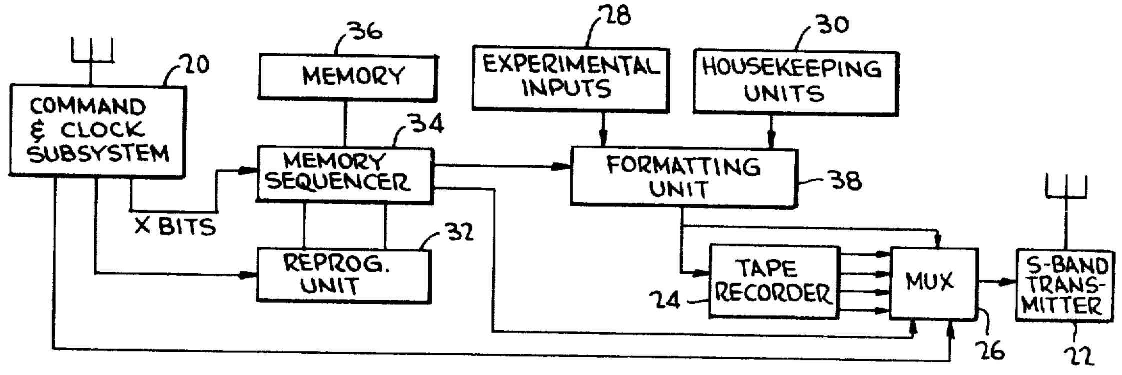
FIG. 1 is a block diagram of a telemetry transmitter system including the present invention.

Reference is now made specifically to the system block diagram of FIG. 1, wherein there is illustrated Nimbus command and clock subsystem 20. Command and clock subsystem 20 is described in detail in a publication entitled "Nimbus Handbook for Experimeters (Nimbus D)" published by the Goddard Space Flight Center, Greenbelt, Md., December 1967. Command and clock subsystem 20 includes a VHF receiver and a command clock with derives a serial binary coded decimal signal indicative of real time, with reference to seconds, minutes, hours and days.

The receiver section of command and clock subsystem 20 responds to signals from a ground station to control the apparatus of the present invention so that a memory therein can be reprogrammed at will or the memory contents can be read out for verification purposes. During the reprogramming cycle, command and clock subsystem 20 derives control and data signals for loading the memory as desired.

A further function of command and clock subsystem 20 is to control the flow of data to microwave, S band transmitter 22. In particular, transmitter 22 is selectively responsive to signals stored in multitrack tape recorder 24, the contents of which are selectively read out by multiplexing switch 26, responsive to an output of command and clock subsystem 20. Thereby, real time transmission of data collected from sources feeding the telemetry system illustrated by FIG. 1 can be obviated and data readout is at will. Transmitter 22 can also be responsive to real time data as fed through multiplexing switch 26 while the telemetry transmitter system operation and memory are being verified.

It is basically the function of the present invention to provide readout of experimental inputs 28 and housekeeping inputs 30. Experimental inputs 28 may be classified into analog and serial digitally coded sets. Typical of the experimental inputs 28 are signals derived from cloudtop spectrometers, infrared spectrometers, ultraviolet detectors, etc. The responses from these data sources may be either in analog form or serial ten-bit digital words. The housekeeping inputs 30 are indicative of monitored conditions interior of the spacecraft vehicle and are usually signal sources having a zero or one value to indicate that a particular device is or is not functioning. An example of the single bit binary signal that comprises housekeeping input sources 30 is the condition of one of the various power supplies within the spacecraft vehicle.

The apparatus of the present invention comprises four main sections, namely: reprogramming unit 32, memory sequencer unit 34, memory 36 and formatting unit 38. Reprogramming unit 32 responds to signals from command and clock subsystem 20 to actuate memory sequencer 34 to read new data into memory 36 or read data out of memory 36 for verification purposes. Formatting unit 38 responds to the signals fed thereto by sequencer unit 34 selectively to control the flow of data between input sources 28 and 30 to tape recorder 24. During the verification or checking modes of the present telemetry transmitter system, the satellite is usually in communication range with a ground station, so that a real time link is established. To this end, the output of formattting unit 38 is fed directly to transmitter 22 through multiplexer 26 in response to an output signal of memory sequencer 34.

Figure 2:
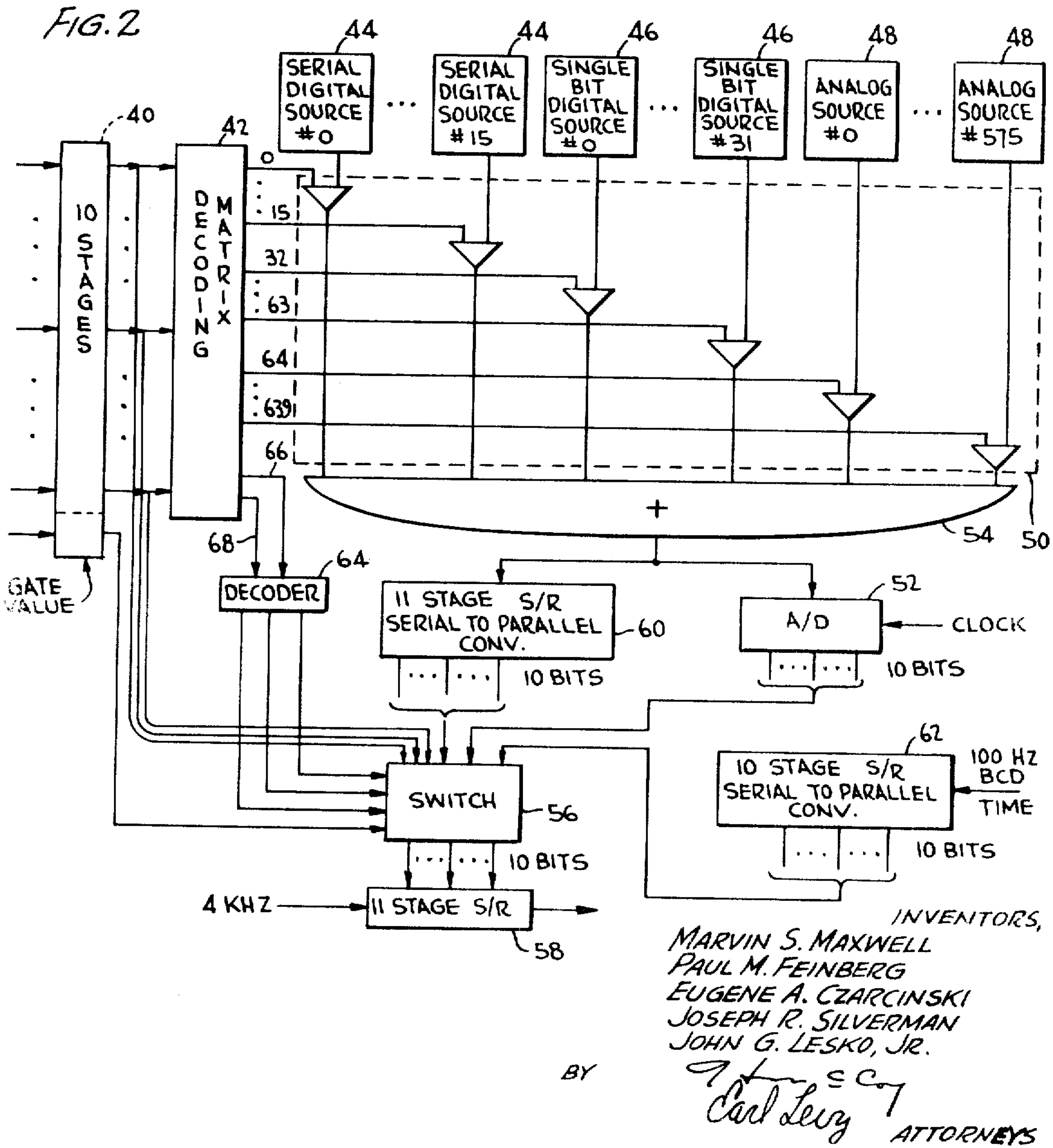
FIG. 2 is a block diagram of a preferred embodiment of the formatter of FIG. 1.

Reference is now made to FIG. 2 of the drawings wherein there is illustrated a block diagram of formatting unit 38, FIG. 1. It is the broad function of formatting unit 38 to selectively gate data from one of sources 28 and 30 or a coded word from memory 36, as coupled through memory sequencer 34, to tape recorder 24.

Formatting unit 38 includes an 11 stage buffer register 40 for receiving an 11 bit parallel binary word from memory sequencer 34. The 11 bit word fed to register 40 by sequencer 34 includes ten data bits and a control, gate/value bit. The ten data bits are selectively indicative of which one of sources 28 and 30 is to be coupled through formatting unit 38, or words representing synchronization or sequence identification.

The ten data bits stored in register 40 are simultaneously read out in response to a pulse from a timing source (not shown in FIG. 2) and coupled to decoding matrix 42. Decoding matrix 42 includes conventional circuitry for deriving 1024 binary signals, one for each of the possible 1024 combinations of the ten data bits derived by register 40. Matrix 42 includes four different sets of parallel outputs, with the first three sets indicating addresses for data sources to be coupled through formatting unit 38 and the last set being for control purposes. The first three sets of outputs from decoding matrix 42 are respectively indicative of data source address: 0–15 for sixteen serial digital sources 44, numbered 0–15; 32–63 for single bit digital sources 46 numbered 0–31; and 64–639 for analog data sources 48, numbered 0–575. Analog sources 48 and serial digital sources 44 generally comprise experimental inputs 28, FIG. 1, while single bit digital sources 46 comprise housekeeping inputs 30. It is to be understood, however, that in certain instances the housekeeping inputs may comprise sources 44 or 48 and that the experimental inputs may be single bit sources 46.

Decoding matrix 42 and sources 44, 46 and 48 feed switch array 50. Switch array 50 includes a multiplicity of switches, equal in number to the number of sources 44, 46 and 48; in the present instance, therefore, the number of switches is 624. Each of the switches in array 50 is responsive to a different one of the sources and a different one of the outputs from the first three output sets of decoding matrix 42. Each of the switches in matrix 50 is normally open and is closed only in response to a binary one signal being derived from the output of decoding matrix 42 to which it is responsive.

Sources 44, 46 and 48 are selectively gated, one at a time, through switches in array 50 to analog-to-digital converter 52 and eleven stage serial-to-parallel converter 60 through OR gate 54 in response to the outputs of decoding matrix 42. Converter 52 responds to the signal source coupled thereto to derive a ten bit parallel binary output signal that is selectively fed through switch 56 to eleven stage parallel-to-serial shift register 58 which is advanced in response to a 4 kHz. clock source.

Eleven stage shift register 60 converts the serial signal of sources 44 into a parallel ten bit binary word and converts the single bit of sources 46 into ten bits all having the same value. Shift register 60 includes eleven stages, only the last ten of which include output leads, and is responsive to digital sources 44 and 46. The digital signals fed to converter 60 are arranged so that after the synchronous data bit segment thereof has been completed, a binary one level is derived during a certain time slot. The binary one level exceeds the amplitude range of analog sources 48 by a sufficient magnitude to enable it to be detected as a binary one signal to the exclusion of the analog signals. The binary one level shifts the preceding ten bits one stage so that all ten readout leads of register 60 are activated once the time required to sample a digital source has elapsed. If an analog signal is coupled through OR gate 54, the voltage thereof cannot reach the assigned voltage for the binary one level and the contents of register 60 cannot be shifted. Thereby, only in response to a digital source being coupled to the input of OR gate 54 is converter 60 loaded with a binary, parallel word indicating the value of one of digital sources 44 or 46.

To provide a record in tape memory 24 of the time at which an experiment is being performed, the time indicating binary signal derived by command and clock system 20 is fed through formatting unit 38. The time indicating signal has a basic frequency of 100 hertz and is arranged in one second time frames. Each one second time frame is divided into ten equal duration 0.1 second parts, the first nine of which indicate time in serial, binary coded decimal code in terms of seconds, minutes, hours and days from satellite launch. Each of the first nine parts is divided into a pair of equal length segments. The first segment includes in seriatim a binary one index marker and four time indicating binary coded bits, while the second segment comprises five serial binary zero dummy bits. The last or tenth part of each frame comprises ten serial bits, wherein the first bit is an index, the second through fifth bits identify the ground station originating the code derived by subsystem 20, and bits six to ten are all binary ones to indicate the end of a frame.

Formatter 38 responds to the 100 Hz. time indicating signal to derive once every 0.2 second a ten bit parallel signal containing the data in two of the parts in each time frame. To this end, the serial bit stream indicative of time is fed from command and clock subsystem 20 to ten stage serial-to-parallel converter shift register 62. Register 62 responds to the bit stream to derive a ten bit parallel output signal that is fed once every minor frame interval of 0.2 second to shift register 58 through switch 56 in response to a clock pulse. The time indicating signal is applied to shift register 62 so that the first five bits in each frame part are gated to register 62 and the five dummy bits are decoupled from the register. Thereby, at the end of each 0.2 second there is stored in register 62 two adjacent time indicating parts of a time frame. The two parts are simultaneously read from the register once every 0.2 second and fed through switch 56 to eleven stage shift register 58.

Shift register 58, in addition to being fed by the ten bit word outputs of circuit elements 52, 60 and 62, is selectively responsive to the ten bit data words read from buffer register 40. The contents of the ten data bits stored in buffer register 40 are selectively fed to shift register 58 through switch 56 that is closed in response to the gate/value bit stored in register 40. In particular, if the gate/value bit has a binary one signal, switch 56 responds to the data bits stored in stages 1–10 of register 40 and feeds them to register 58.

Control of switch 56 to selectively gate the ten parallel bits in each of circuit elements 52, 60 and 62 to shift register 58 is under the control of decoder 64. Decoder 64 responds to the gate/value stage of register 40, as well as a signal on control output leads 66 and 68 of decoding matrix 42. Output lead 66 is activated to a binary one value if the signal fed to matrix 42 indicates that the contents of analog-to-digital converter 52 are to be fed through switch 56, while a binary zero signal is derived if the contents of serial-to-parallel converter 60 are to be fed through the switch. The second output lead 68 of matrix 42 has a binary one value to command feeding the time indicating signal stored in register 62 through switch 56. Hence, in response to the control signals fed thereto on leads 66 and 68, as well as a signal from the gate/value stage of register 40, decoder 64 derives four output signals respectively commanding switch 56 to gate: (1) the contents of converter 52 to register 58; (2) the contents of converter 60 to register 58; (3) the contents of register 62 to register 58; and (4) the contents of the ten least significant stages of register 40 to register 58.

Eleven stage register 58 is responsive to the ten bit parallel signal derived from switch 56 and to a 4 kHz. clock pulse source. Thereby, a 4 kHz. serial ten bit word is read from the most significant bit stage of register 58 during each time interval of 2.5 milliseconds. Register 58 includes eleven stages so that successive words are derived from the register without interruption between the first and last bits between adjacent words. The timing of formatter 38 is such that during each 2.5 ms. word interval the contents of register 40 are read into shift register 58. During a second 2.5 ms. word interval the ten bit word stored in register 58 is read out either to tape recorder 24 to multiplexing switch 26.

Eighty such 2.5 ms. operations ae performed during each 0.2 second minor frame occurring between adjacent readouts of register 62. During each minor frame, many similar commands and signals are derived in corresponding 2.5 ms. time slots. As an example, in the first two time slots of each minor frame, sync words are fed through register 40 and switch 56 to register 58; in the third 2.5 ms. time slot the gate connected to analog source No. 9 and the analog-to-digital output of decoder 64 are activated simultaneously so that register 58 responds to a coded signal indicative of analog source No. 0. During certain correspondingly numbered minor frame time slots, however, different signals are derived to provide submultiple signal sampling. As an example, in the sixth time slot of each minor frame a minor frame identification signal, which is different for each minor frame, is derived; in the sixteenth time slot of every fifth (0, 5, 10, etc.) minor frame, single bit source No. 9 is sampled; in the sixteenth time slot of every fifth plus one (1, 6, 11, etc.) minor frame, single bit source No. 1 is sampled. For the specific application being considered, eighty sequentially derived minor frames comprise a major frame of sixteen seconds duration. After a major frame has been completed, the initial minor frame is again initiated so that a complete sampling interval has a sixteen second period.

Figure 3:
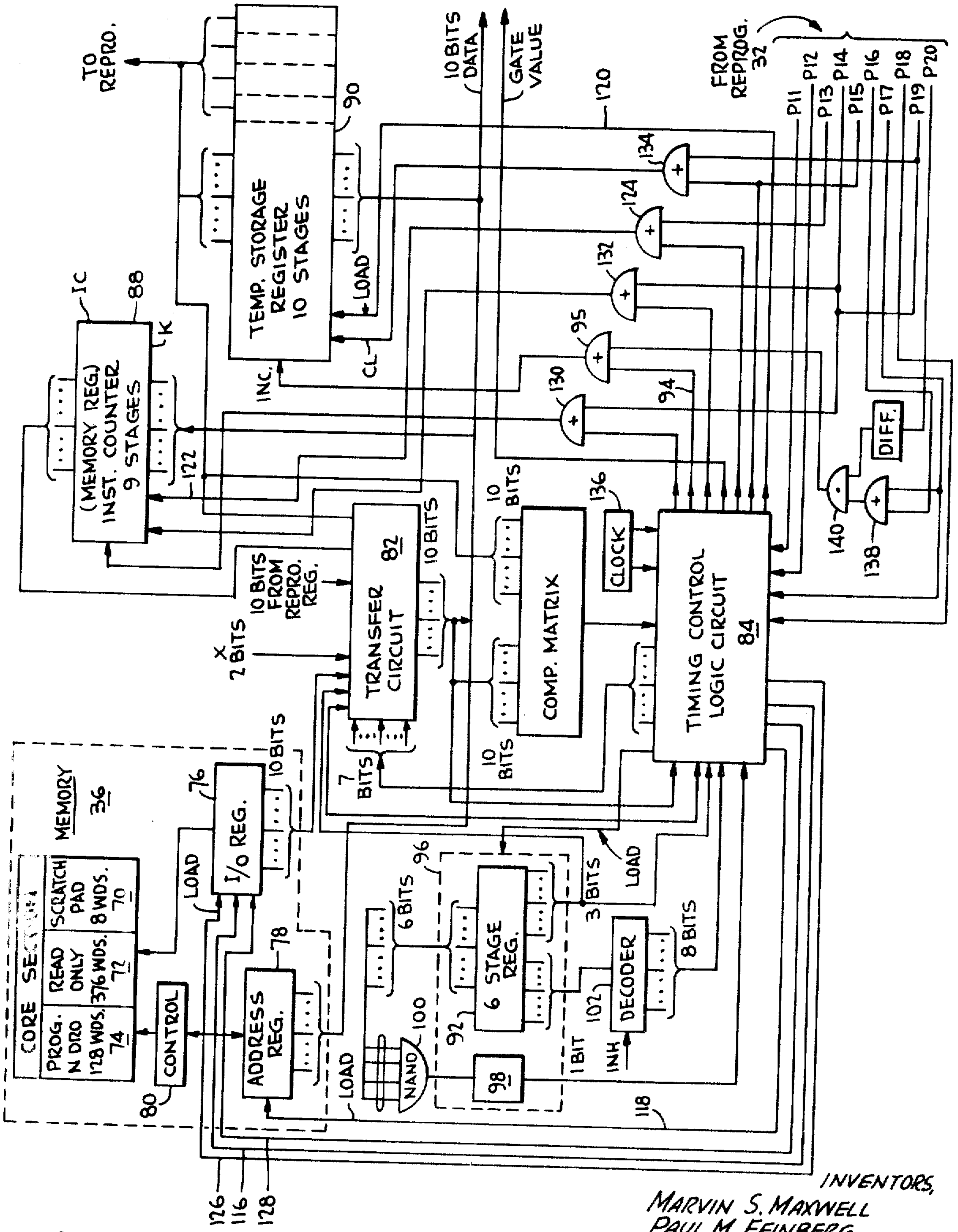
FIG. 3 is a block diagram of a preferred embodiment of the memory and memory sequencer of FIG. 1.

Reference is now made to FIG. 3 of the drawings wherein there is illustrated a block diagram of memory sequencer 34 and memory 36, FIG. 1. Basically, it is a function of memory sequencer 34 to control the readout of memory 36 in response to signals from reprogramming unit 32 and signals generated internally of the sequencer. The words in memory 36 are sequentially fed to formatter 38 to selectively: (1) control readout of the various data sources; (2) feed words directly from register 40 to register 58; and (3) control switch 56, as discussed supra.

Before going into a detailed description of memory sequencer 34, consideration will be given to memory 36 which is of a generally conventional type. Memory 36 includes three different sections for storing a total of 512 ten bit words and comprises: scratch pad section 70 for temporarily storing eight ten bit words; nondestructive readout, read only section 72, for storing 376 ten bit words; and nondestructive readout, programmable (read/write) section 74 for storing 128 ten bit words. Sections 70, 72 and 74 of the 512 word memory are segmented with addresses denominated: scratch pad memory section 70, address words 0–7; read only section 72, address words 8–383; and programmable section 74, address words 384–511.

The 128 words in the nondestructive readout, programmable memory section 74 can be changed at will in response to signals derived by reprogramming unit 32, either prior to the time the system is made operational or after it has been put into use, by means of a telemetry link. In contrast, 376 word read only section 72 is programmed or loaded by means of hard wire connections from an external memory loading device prior to the time of the apparatus being utilized for telemetry purposes. The contents of eight word scratch pad memory 70 are continually being altered while the system is in normal operation. Scratch pad memory section 70, in effect, provides eight counters necessary to generate subcommutation sequences for controlling the switches in array 50 of formatter 38, FIG. 2, as well as to activate other control functions.

Memory 36 can be thought of as being composed of up to four independent sections, each capable of generating a particular program. This capability is achieved by assigning a different starting address to each of the four programs. Control of which of the four different programs is in response to a two bit code coupled to sequencer 34 by command and clock subsystem 20 in response to a signal received by subsystem 20 from a ground command.

Each word in memory 36 includes ten bits, which are broken down into three fields covering bits 1–3, bits 4–6 and bits 7–10. Bits 7–10 control the gate/value bit fed by sequencer 34 to buffer register 40 of formatter 38, FIG. 2. If any of bits 7–10 has a binary zero level, circuitry (described infra) is included so that the word stored in register 40 enables a selected one of the data sources to be fed through switch 56 to shift register 58, as determined by all ten bits of the word in register 40. In the alternative, if each of the bits 7–10 has a binary one value, sequencer 34 is activated to one of eight instructions or commands, determined by bits 4–6 of the memory word. Associated with several of the commands are word locations in scratch pad memory 70, which locations are indicated by the eight combinations defined by bits 1–3 of the memory words. Hence, each word in memory 36 is capable of activating sequencer 34 into two broad functioning modes and in one of the modes eight different commands or instructions are provided.

Data are selectively written into memory sections 70 and 72 and read from sections 70, 72 and 74 through ten bit, buffer input-output register 76. Control of the memory word written into or read out of register 76 is under the control of nine bit address register 78 which supplies address specifying signals to sections 70, 72 and 74 through control network 80. Address register 78 includes a load input terminal, while input-output register 76 includes an input terminal enabling it to be loaded. Register 76 can eiher, under control of circuit 80: (1) read the contents of a memory address specified by address register 78; or (2) write a word into an address specified by register 78.

It is basically the function of sequencer 34 to control the flow of data into and out of memory 36 in response to control signals generated by circuitry internally of the sequencer, whereby different word positions in memory 36 are sequentially reached to generate the minor and major frame sampling. In addition, sequencer 34 responds to signals derived by reprogramming unit 32, as well as command and clock subsystem 20, to read new data into and verify the contents of memory 36.

The flow of all data words to and from memory 36 and within sequencer 34 is through transfer circuit 82. Transfer circuit 82 includes ten different parallel switch elements for selectively transferring words from memory 36 and various registers in memory sequencer 34 to ten parallel output leads, on which are sequentially derived data words that are routed from one section of the memory equencer or memory, or to register 40 of formatter 38. Control of the selected word to be coupled through transfer circuit 82 is in response to activation of one of seven control leads or bits, denominated SI–S6 and $\overline{S6}$ of seven control leads or bits, denominated 84 on seven lead bus 86. Transfer circuit 82 responds to one of the seven bits in bus 86 to transfer one of six input words to the ten parallel output leads thereof.

Transfer circuit 82 is responsive to three ten bit words, one nine bit word, one two bit word and one three bit word. In particular, the ten bit words fed to transfer circuit 82 are derived from: input-output register 76 of memory 36 which stores a word to indicate the contents of a memory address read out under the control of address register 78; a ten bit register in reprogramming unit 32, for storing a word indicative of the contents of one of the 128 words to be loaded into programmable memory section 74; and ten stage temporary storage counter or register 90. The nine bit word is fed to circuit 82 from nine stage instruction counter 88 and indicates the next address in memory 36 to be read out or written into. The two bit word, denominated as the X bits, is fed to transfer circuit 82 from subsystem 20 to indicate which of the four possible programs in memory 36 are to be utilized, while the three bit word is derived from the three least significant stages of instruction register 92 to indicate counter locations in scratch pad memory 70.

Information is gated through transfer circuit 82 from input-output register 76, instruction counter 88 and temporary storage register 90 in response to the signals S1, S2 and S5 being respectively derived by timing and control logic circuit 84. The ten bits from the register in reprogramming unit 32 are coupled through transfer circuit 82 whenever the contents of that register are read out, as will be described infra. In response to the command signals S3 and S6, the two X bits derived by command and clock subsystem 20, indicative of which one of the four programs of memory 36 is selected, are respectively coupled through first and second pairs of different gates of transfer circuit 82. The command S3, in addition to enabling the two X bits to be sampled, activates transfer circuit 82 to feed the X bits to timing and control logic network 84. Network 84 responds to the X bits derived by the first pair of gates in circuit 82 so that the next ten bit word fed to transfer circuit 82 can be examined to determine if it has a zero value.

Transfer circuit 82 responds to the coded signals S6 so that the two X bits can control the starting position of the next major frame read from memory 36 and instruction counter 88 is cleared, i.e., is set to a zero level. Instruction counter 88 is cleared to a zero level by feeding the $\overline{S6}$ signal to a clear input terminal of counter 88 by way of lead 94 and OR gate 95.

The S4 output signal of timing and control logic circuit 84 activates transfer circuit 82 to enable scratch pad counter number indicating bits 1, 2 and 3 in six stage buffer register 92 to be fed through three different gates of the transfer circuit. Six stage buffer register 92 is a segment of instruction register 96 which is selectively responsive to words read from memory 36. Buffer register 92 responds to parallel bits 1–6 of each memory word and stores each of them in a corresponding register stage.

Instruction register 96 responds to each word read from memory 36 and stores a decision as to whether an instruction is to be executed or if one of the switches in array 50 of formatter 38, FIG. 2, is to be selected. The decision is made by sampling bits 7–10 with NAND gate 100, the output of which is stored in register stage 98. If each of bits 7–10 has a binary one value, NAND gate 100 derives a binary zero signal, whereby the signal stored in stage 98 indicates that a memory command is to be executed. The word stored in register stage 98 is coupled to timing and control logic circuit 84 to control derivation of the S4 signal coupled to transfer circuit 82. If the S4 signal is activated, bits 1–3 in the correspondingly numbered stages of buffer register 92 are fed through transfer circuit 82 to address register 78, where they are stored to indicate which scratch pad word in memory section 70 is selected.

Bits 4–6 of buffer register 92 are fed to decoder network 102, having seven output leads, each indicative of one of seven of the eight commands which the system is capable of executing. The seven bits derived by decoder 102 are normally fed to timing and control logic circuit 84, which responds thereto to establish different logical connections between the various registers of the sequencer 34 and memory 36. While the contents of memory 36 are being reprogrammed or verified and for one of the eight commands, however, circuit 84 derives a control signal to inhibit the output of decoder 102 so that no memory commands are executed.

A further input to timing and control logic circuit 84 is a one bit signal derived by comparison matrix 112. Comparison matrix 112 compares the ten bits of each word derived from transfer circuit 82 with the ten bits stored in register 90. In response to the word coupled to comparison matrix 112 from transfer circuit 82 having a magnitude in code greater than or equal to the word in temporary storage 90, the comparison matrix derives a binary one signal, while a binary zero is derived by the matrix if the output of register is less than the word derived by circuit 82. In response to certain commands (described infra) being fed to timing and control logic circuit 84, the comparison indication of matrix 112 selectively controls data flow between the various registers of sequencer 34 and memory 36.

The output words of transfer circuit 82, in addition to being selectively fed to inputs of timing and control logic circuit 84, are selectively fed to: input-output register 76, instruction counter 88, temporary storage register 90, and buffer register 40 of formatter 38, FIG. 2. The selective connection of transfer circuit 82 to each of the aforementioned registers and counters is in response to load signals derived for each of the registers and counters by timing and control logic circuit 84. In particular, input-output and address registers 76 and 78 are loaded with ten bit words from transfer circuit 82 in response to signals derived by timing and control logic circuit 84 on leads 116 and 118. Register 90 is fed by the output of transfer circuit 82 in response to a binary one signal on lead 120, while counter 88 is loaded in response to a binary one signal on lead 122, as coupled through OR gate 124 from timing and control logic circuit 84.

Input-output register 76 includes read and write input terminals, enabled when binary one signals are derived on leads 126 and 128 by timing and control logic circuit 84. Timing and control logic circuit 84 selectively increments instruction counter 88 and temporary storage register 90 by a count of one in response to signals coupled through OR gates 130 and 95, respectively. Counter 88 and register 90 are selectively cleared to the zero state in response to signals coupled from logic circuit 84 through OR gates 132 and 134, respectively.

Sequencer 34, in addition to being responsive to signals derived internally thereof and from memory 36, is controlled by signals from reprogramming unit 32. Reprogramming unit 32 is activated to either a reprogramming condition, a verify condition, or a status whereby it has substantially no effect on the operation of sequencer 34, which occurs during normal operation of the system. Ten different bi-level signals, denominated by P11–P20, are applied to sequencer 34 by programmer 32. Signals P11–P16, P18 and P20 are selectively derived as binary one values while reprogramming unit 32 is activated to the reprogramming state, while signals P17, P19 and P20 selectively have binary one values in response to energization of the reprogrammer to the verify state. If unit 32 is not in either the reprogramming or verify state, all of signals P11–P20 remain at the binary zero level.

The P11, P12, P17 and P18 signals derived by reprogrammer 32 are fed to time and control logic circuit 84 of sequencer 34. The P11 signal is selectively coupled to circuit 84 while the reprogrammer is in the reprogram mode after selected data words have been written into memory 36 to enable the write and load control leads of input-output register 76 and to enable the increment input of instruction counter 88 to be activated. At substantially the same time that signal P11 is derived, the P12 signal is fed through circuit 84 to the load input terminal of instruction counter 88 and enables the load input of address register 78. During the verify mode, as each ten bit word is read from memory 36, the P17 signal is derived as a binary one pulse and fed through logic circuit 84 to energize the gate/value output of timing and control logic circuit 84 to a binary one level, whereby each word read from memory 36 is fed through buffer register 40 to shift register 58, FIG. 2, by way of switch 56 in formatter 38. The P17 signal is also fed through OR gate 138 to enable AND gate 140 once as each word is read from memory, whereby the AND gate can pass an output signal from differentiator 142 through OR gate 95 to the increment input of temporary storage register 90. The P18 signal is derived by reprogrammer 32 during the reprogram mode as each new data bit to be loaded into memory 32 is received by the reprogrammer and is fed through logic circuit 84 to the S1 lead in bus 86; it will be recalled that the S1 lead in bus 86 enables transfer circuit 82 to be responsive to signals from input-output register 76.

The P20 signal is derived as a binary one as each new data bit to be loaded into memory is received with reprogrammer 32 in the reprogram state. In contrast, in the verify mode, the P20 signal has a binary one value only while the last word in memory 36 is being read out. Differentiator 142 responds to each binary one in the P20 signal to derive a short duration output pulse. The pulse derived by differentiator 142 is coupled through AND gate 140 in response to the AND gate being enabled by either the P16 or P17 signals having a binary one value, as coupled through OR gate 138. In response to each binary one output of AND gate 140, as coupled through OR gate 95, temporary storage register 90 is incremented by a count of one. Hence, in the reprogramming mode, the count of register 90 is advanced by one as each new data bit to be loaded into memory 36 is received by reprogrammer 32 and in the verify mode, register 90 is incremented after the contents of memory 36 have been completely read out.

Signals P13 and P14 from reprogramming unit 32 are selectively derived after each new data word has been loaded into memory and respectively coupled through OR gates 124 and 132 to the load and clear input terminals of instruction counter 88. Thereby, after selected new data words have been received by reprogrammer 32, instruction counter 88 is cleared and then loaded with an address received from the ground station.

In the reprogram mode, the P15 and P16 signals are respectively derived as binary one values after each data word has been and as each data bit is being received by reprogrammer 32. The P15 and P16 signals are respectively applied to the clear and increment input terminals of temporary storage register 90 to clear the contents of the storage register after each new word has been received and advance the count stored in the register by one as each bit is received. Storage register 90, as well as instruction counter 88, is cleared whenever reprogramming unit 32 is activated to the verify state, as indicated by signal P19 having a binary one level. The binary one level of signal P19 is fed to the clear input terminals of instruction counter 88 and storage register 90 by way of OR gates 130 and 134, respectively.

Figure 4:
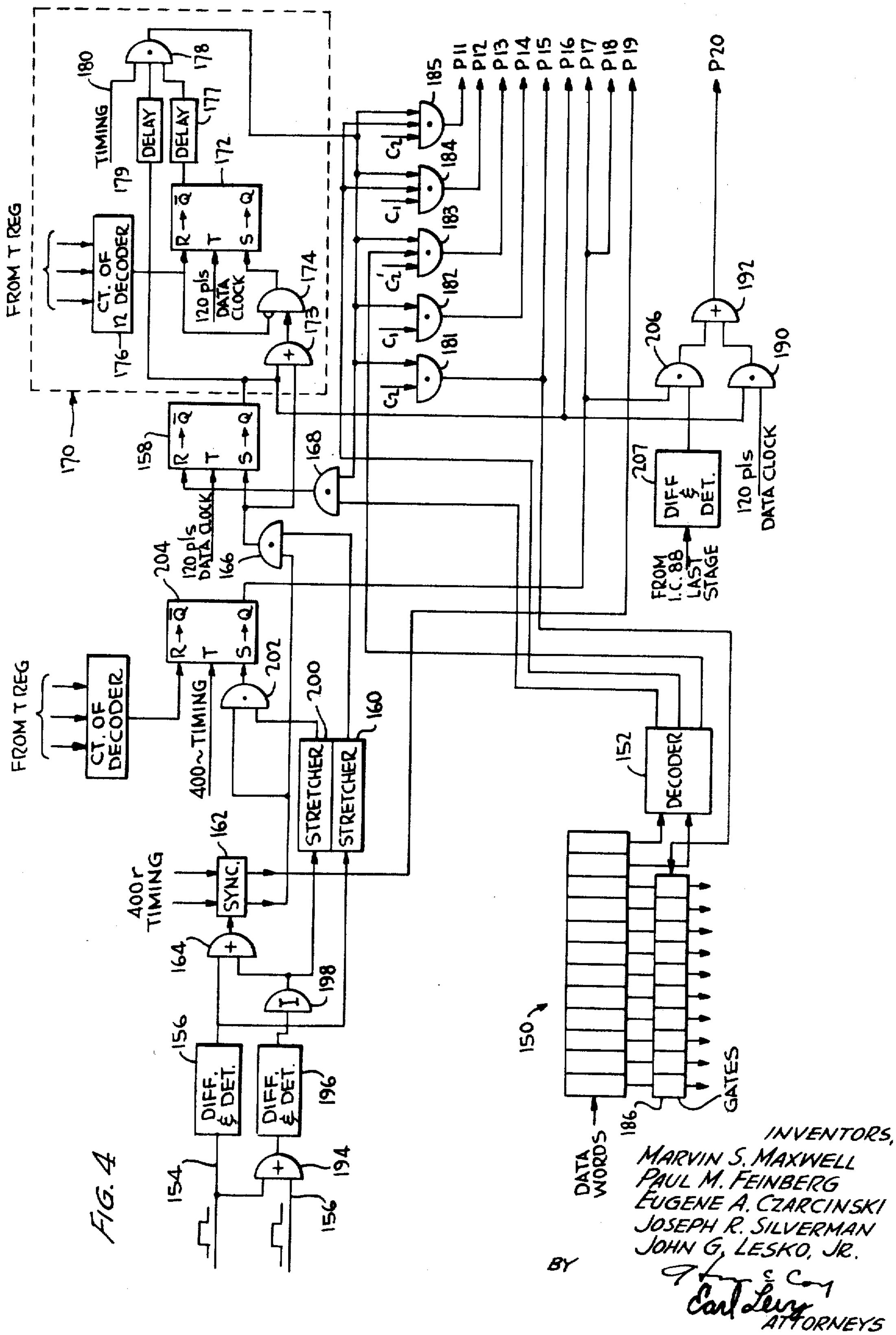
FIG. 4 is a block diagram of a preferred embodiment of the reprogrammer of FIG. 1.

Reference is now made to FIG. 4 of the drawings wherein there is illustrated a block diagram of reprogramming unit 32. Broadly, it is the function of reprogramming unit 32 to: reload the programmable section 74 of memory 36 with a new set of memory words and thereafter read out memory 36 a predetermined number of times and feed the memory contents to transmitter 22; and respond to a command from a ground station to enable the contents of memory 36 to be read out and transmitted at will.

Words to be loaded into section 74 of memory 36 are fed to reprogramming unit 32 from a ground station via command and clock subsystem 20, FIG. 1. Each word includes twelve bits, the ten least significant of which are indicative of data words to be loaded into memory section 74 and the two most significant of which indicate one of three commands for the reprogramming unit. The command bits indicate whether a particular data word is an address or a data word in a particular sequence or an end of transmission (stop) word. The particular binary codes for the command in each word are: the bits 10 indicate that the remaining ten bits of the word are the first word in the sequence; the bits 01 indicate that the remaining bits in the word are an intermediate data word in a sequence; and the bits 00 indicate that no more data are to be sent, i.e., a stop command.

The sequentially derived serial twelve bit data words are fed by command and clock subsystem 20 to twelve stage shift register 150 at a bit rate of 120 bits per second, whereby once every 0.1 second a different twelve bit word is loaded into register 150. The two most significant bit positions of register 150 are read by decoder 152, the output of which is sampled once every word, after each word has been loaded into register 150. Decoder 152 responds to the two most significant bits of each twelve bit word to derive one of three binary signals having binary one values in response to the three command codes 10, 01 and 00.

To enable the command codes derived by decoder 152 to control: (1) the derivation of signals P11–P15 which feed sequencer 34; and (2) readout of the ten most significant bit stages of register 150 during the reprogramming operation, reprogrammer 32 is responsive to a second or mode signal from a ground station, as coupled through subsystem 20 on lead 154. The mode signal has a binary one level only throughout the interval while data words are loaded into memory 36. A verify signal is transmitted from the ground at will and is detected by subsystem 20 as a binary one signal on lead 157 to command readout of the contents of memory 36. A similar function is performed in response to the trailing edge of the mode signal, after all of the new data words have been loaded into memory 36.

Reprogramming unit 32 responds to the leading, positive going edge of the mode signal on lead 154 to enable data words fed into serial-to-parallel converting shift register 150 to be loaded into the programmable segment 74 of memory 36. To this end, the leading edge of the rectangular waveform on lead 154 is detected by differentiating and detector network 156, which derives a relatively short duration, positive pulse, in response to a positive going transition of the mode signal.

The pulse derived by network 156 is generally out of synchronism with signals derived in the present system and must be converted to a signal having a common time base with all other signals in the system. Synchronizing the output pulse of network 156 is performed by feeding the output of the differentiating and detector network in parallel to pulse stretcher 160 and synchronizer 162, the latter connection being by way of OR gate 164. Synchronizer 162 is responsive to a pair of sequentially derived pulses, each of which has a repetition frequency of 400 hertz, but a displaced occurrence time. Stretcher 160 is designed so that the output thereof subsists for a period equal only to the time interval between adjacent 400 hertz timing pulses fed to synchronizer 162. The outputs of synchronizer 162 and stretcher 160 are fed to AND gate 166 which feeds the set (S) input of reprogramming flip-flop 158. Thereby, in response to the asynchronously occurring leading edge of the mode signal on lead 154, flip-flop 158 is activated to the set state in synchronism with timing pulses generated internally within the present system.

In response to being activated to the set state, reprogramming flip-flop 158 is energized so that a binary one signal can be derived from the Q output thereof. The Q output of flip-flop 158 is periodically sampled in response to a 120 pulse per second data clock being fed to the trigger (T) input thereof. Each pulse of the data clock fed to the T input of reprogramming flip-flop 158 occurs in synchronism with one of the bits comprising the data word fed to format register 150.

Flip-flop 158 remains in the set state to derive a 120 hertz signal at the Q output thereof as long as memory section 74 is being reprogrammed, i.e., the flip-flop is maintained in the set state until memory section 74 has been completely reloaded.

Reloading of the memory section 74 is terminated in response to the two least significant bits of the data word fed to register 150 having the code 00. The code 00 is detected by decoder 152 and fed through AND gate 168, enabled at the end of each data word fed to register 150, to the reset input of flip-flop 158. In response to flip-flop 158 being activated to the reset state, a binary zero signal is continuously derived at the Q output of the flip-flop, to indicate that the reprogramming operation has ceased.

With reprogramming flip-flop 158 in the set state, the Q output signal thereof enables temporary storage register 90 to be incremented in synchronism with the feeding of data bits into register 150. To this end, the Q output of flip-flop 158 is fed as an enable input to AND gate 190, having a second input responsive to the data clock pulse source. The output of AND gate 190 is fed through OR gate 192 to derive signal P20 that is fed to the increment input of storage register 90 via differentiator 142. The output of differentiator 142 is fed through AND gate 140 to the increment input of register 90 since the Q output of flip-flop 158 is derived as signal P16. The P16 binary one signal is fed through OR gate 138 to enable AND gate 140 to pass the short duration output of differentiator 142 to the increment input of register 90.

The Q output of flip-flop 158 is also derived as signal P18. The P18 signal has a binary one value that is fed to timing and control logic circuit 84. In response to flip-flop 158 being activated to the set state and the Q output of flip-flop having a binary one value, the P18 signal inhibits the normal operation of circuit 84 and enables the circuit to perform only those functions indicated supra.

To generate a pulse indicating that a twelve bit data word has been completely loaded into register 150, network 170 is provided. Network 170 includes flip-flop 172, having a set input responsive to the Q output of reprogramming flip-flop 158 or the output of AND gate 166, as coupled through OR gate 173 and inhibit gate 174. Thereby, as soon as reprogramming flip-flop 158 is activated to the set state, flip-flop 172 is activated to the set state and a binary one can be derived from its $\overline{Q}$ output.

Flip-flop 172 is driven to the reset state after each twelve bit data word has been loaded into format register 150. To this end, count of twelve decoder 176 is provided to be responsive to the output of temporary storage register 90 of memory sequencer 34. T register 90 is advanced by a count of one for each bit in the data words fed to register 150 so that upon completion of a twelve bit word being loaded into register 150, T register 90 is loaded with a count of twelve. The count of twelve in register 90 is detected by decoder 176 which derives an output to activate flip-flop 172 to the reset state. The output of decoder 176 is also fed to the inhibit input terminal of gate 174, whereby the binary one Q output of flip-flop 158 is decoupled from the set input of flip-flop 172, and flip-flop 172 is reset.

The set and reset states of flip-flop 172 are sampled in synchronism with the data bits fed to register 150 for feeding the 120 pulse per second data clock signal to the T or trigger input terminal of flip-flop 172. The pulses in the data clock signal fed to flip-flop 172 occur slightly after the corresponding pulses fed to flip-flop 158 to enable the count detected by decoder 176 to be read from flip-flop 172 while all twelve bits of the word which caused register 90 to reach the count of twelve are in register 150. Thereby, binary one signals are derived from the Q and $\overline{Q}$ outputs of flip-flop 172 in synchronism with the coupling of bits into register 150.

The binary one $\overline{Q}$ output of flip-flop 172, derived after each twelve bit data word has been supplied to register 150, is fed through synchronized delay 177 to an input of AND gate 178. The input of AND gate 178 is also responsive to the Q output of flip-flop 158, as fed through synchronized delay 179, as well as a short duration timing pulse on lead 180. Delays 177 and 179 and the occurrence time of the pulse on lead 180 are such that AND gate 178 derives a relatively short duration binary one pulse during the last bit of each twelve bit data word fed to register 150.

The output pulse of AND gate 178 is fed in parallel to AND gates 168 and 181–185. The pulse fed to AND gate 168 by AND gate 178 enables the former gate so that if the output of decoder 152 indicates that the two least significant bits of the data word are 00, flip-flop 158 is reset to terminate the reprogramming operation.

The enabling signal fed by AND gate 178 to AND gates 181–185 is combined with signals from decoder 152 and timing signals having a basic frequency of 800 hertz. Gate 181 responds to the output of AND gate 178 and a timing signal of frequency 800 hertz and phase C2 to derive the P15 output signal. The P15 signal is fed through OR gate 134, FIG. 3, to the clear input of temporary storage register 90. Thereby, upon completion of each twelve bit data word being loaded into register 150, storage register 90 is reset to zero.

Simultaneously with the P15 signal being generated gate 181 enables gating circuit 186. Gating network 186 includes ten individual gates, each separately responsive to a different one of the ten least significant stages of register 150. The signals stored in stages 3–12 of register 150, the ten data bits in each data word, are read out in parallel from the register through gates 186 in response to the output of AND gate 181 after each twelve bit word has been loaded into the register and simultaneously with register 90 being reset.

Gates 182 and 183 respond to the 10 output of decoder 152, the output of AND gate 178, and are respectively responsive to 800 hertz timing pulses at phases C1 and C2. Thereby, the P13 and P14 output signals of gates 183 and 182 are derived at the same frequency, but at different times or have different phases. The P13 and P14 signals are derived after a complete data word has been loaded into register 150, provided the data word is the starting address for a sequence of words to be loaded into memory section 74. The P14 signal is fed through OR gate 132, FIG. 3, to the clear input of instruction counter 88. The P13 signal is fed to the load input of instruction counter 88 via OR gate 124, FIG. 3, whereby the instruction counter can be loaded with the word stored in buffer register 150. The word in buffer register 150 is fed to instruction counter 88, while the load input of the counter is energized, through gates 186 and transfer circuit 82 by way of the connection established after each word has been loaded into register 150.

Gates 184 and 185 are responsive to the 01 output of decoder 152, the output signal of AND gate 178, and the 400 hertz timing signals at phases C1 and C2, respectively. Thereby, after each data word has been loaded into register 150, output signals P12 and P11 have binary one values at displaced times, provided the command bits in the data word indicate that addresses in memory section 74 are to be loaded in sequence. The P12 signal derived from AND gate 184 is fed to timing and control logic circuit 84 where it is gated to transfer circuit 82 so that the contents of instruction counter 88 can be read out. In addition, the P12 signal is fed by way of timing and control logic circuit 84 to lead 118 to enable the load input of address register 78. Thereby, the contents of instruction counter 88 are transferred to address register 78 by way of transfer circuit 82.

After the P12 signal binary one value has terminated, the P11 binary one is derived from gate 185. The P11 signal is fed to timing and control logic circuit 84 and from thence it is coupled in parallel to the increment input of instruction counter 88 and the load input of input-output register 76 in memory 36. With the load input of register 76 enabled, the ten most significant bits in register 150 are fed through gate 186 and transfer circuit 82 to load the input-output register. After register 76 has been loaded, timing and control logic circuit 84 derives a signal on lead 128 to enable register 76 so that information is written into the address of memory section 74 determined by address register 78.

To provide a better and more complete understanding as to the manner by which reprogramming unit 32 functions with flip-flop 158 activated to the set state, an exemplary set of operations will be considered. In particular, it will be assumed that six twelve bit data words, given by Table 1, are sequentially fed to formatting register 150 and the manner by which reprogrammer 32, memory sequencer 34 and memory 36 function in response to these six data words will be considered.

TABLE 1

| | | | | | | | | | | | | |
|---|---|---|---|---|---|---|---|---|---|---|---|---|
| 1 | 0 | 0 | 0 | 0 | 0 | 1 | 1 | 1 | 1 | 1 | 1 | 0 |
| 2 | 0 | 0 | 0 | 1 | 0 | 1 | 1 | 1 | 0 | 0 | 0 | 1 |
| 3 | 0 | 0 | 1 | 1 | 1 | 0 | 0 | 1 | 1 | 1 | 1 | 1 |
| 4 | 0 | 0 | 0 | 0 | 1 | 1 | 1 | 1 | 1 | 1 | 1 | 0 |
| 5 | 0 | 0 | 0 | 0 | 0 | 0 | 0 | 1 | 1 | 1 | 0 | 1 |
| 6 | 0 | 0 | 0 | 0 | 0 | 0 | 0 | 0 | 0 | 0 | 0 | 0 |

NOTE.—In Table 1 the leftmost bit in each row signifies the last bit in' i.e., the least significant bit, while the rightmost bit in each row signifies the first bit in, i.e., the most significant bit.

Of the data words in Table 1, the two most significant bits of words 1 and 4 are 10, to indicate that a new address in a sequence is to be loaded into memory section 74. The two most significant bits of data words 2, 3 and 5 are 01, to signal that the remaining ten bits of the words represent data to be loaded into addresses of memory section 74. Data words 2 and 5 represent data, in the form of switches numbered 92 and 7 of array 50, being loaded into the memory addresses 31 and 63 indicated by words 1 and 4, while word 3 represents switch number 228 of array 50 that is loaded into the memory location following the word slot occupied by word 2, i.e., address 32. The two most significant bits of data word 6 are 00, a code indicating that the last address to be loaded into section 74 has been reached.

Prior to ground station transmission of the least significant bit of data word 1, a mode switch signal is transmitted from the ground station and received by command and clock subsystem 20. In response to the mode switch signal, a positive going transition is derived on lead 154 and converted into a synchronous, relatively short duration pulse by network 156, OR gate 164 and synchronizer 162. The two synchronous, but differently phased, pulses derived by synchronizer 162 respectively actuate flip-flop 158 to the set condition which derives the P19 signal that is fed to the clear input terminals of instruction counter 88 and temporary storage register 90.

Thereby, counter 88 and register 90 are both reset to the zero state and flip-flop 158 is activated to a state indicating that the reprogramming operation is occurring. Activation of reprogramming flip-flop 158 to the set state enables pulses to be applied to the input of inhibit gate 174 which inhibits the normal operation of memory sequencer 34, as well as causing the signals P16, P18 and P20 to be derived as binary one pulses in synchronism with bits in the data words. Simultaneously with flip-flop 158 being set, flip-flop 172 is activated to the set state in response to the output of AND gate 166 through the connection via inhibit gate 174. The inhibit input of gate 174 is deactivated when the output of AND gate 166 has a binary one value because register 90 is cleared to a state of zero in response to the P19 signal.

With flip-flops 158 and 172 set, the most significant bit of data word 1 is fed to the extreme left stage of register 150. As the most significant bit of data word 1 is being fed to the extreme left stage of register 150, the first data clock pulse is derived and applied to the trigger input terminals of flip-flops 158 and 172, as well as to one input of AND gate 190. In response to the data clock pulses applied to circuit elements 158, 172 and 190, signals P16 P18 and P20 are derived as binary one pulses. The P16 binary one pulse is fed through OR gate 138 to enable gate 140 so that it passes the differentiated pulse derived by network 142 in response to the P20 signal. AND gate 140 thereby derives a relatively short duration pulse that is fed through OR gate 96 to the increment input of register 90 and the T register state is advanced from zero to one. The P18 pulse is fed to timing and control logic circuit 84 to inhibit most of the circuitry therein as each data clock pulse is being generated.

As succeeding pulses in the first data word occur, they are shifted to adjacent stages in register 150 from left to right as the count in register 90 is being advanced. The count in register 90 is advanced in synchronism with the propagation of pulses between stages of register 150, whereby as the twelfth bit comprising data word 1 is being loaded into register 150, register 90 is incremented to a count of 12. The count of 12 in register 90 is sensed by decoder 176 which derives a binary one output signal to reset flip-flop 172. After flip-flop 172 has been reset, the data clock pulse is applied to the trigger input thereof to enable the $\overline{Q}$ binary one signal to be fed to AND gate 178. Simultaneously with the $\overline{Q}$ output of flip-flop 172 being fed to gate 178, the Q signal derived from flip-flop 158 is fed to the gate via delay 179, while a timing pulse is supplied to the AND gate. AND gate 178 responds to these pulses to derive an end of word indicating pulse.

The end of word pulse is derived from AND gate 178 while all twelve bits comprising data word 1 are loaded in register 150. In response to the two least significant bits in data word 1 loaded in register 150, decoder 152 derives a binary one signal on the 10 output thereof. AND gates 182 and 183 respond to the 10 output of decoder 152, the output of AND gate 178 and timing pulses to derive P14 and P13 as binary one signals at slightly displaced times. The P14 pulse is coupled to the clear input terminal of instruction counter 88 so that each stage of instruction counter has a zero therein. The P13 signal is fed through timing and control logic 84 to activate instruction counter 88 so that it can be loaded with data.

Simultaneously with the energization of AND gate 183, AND gate 181 is activated in response to the output of AND gate 178, whereby the ten least significant bits in the ten left stages of register 150 are fed through gate 186 to transfer circuit 82. Since instruction counter 88 has been activated so that it can be loaded, the ten least significant bits in register 150 are fed to instruction counter 88. The word now fed and stored in instruction counter 88 is address 31 of memory section 74 which is to be loaded with the ten least significant bits of data word 2, as described infra.

Simultaneously with activation of gates 186, AND gate 181 activates signal P15 to a binary one state. The P15 signal is fed through OR gate 134 to clear register 90 to a zero state. With register 90 in the zero state, a binary zero is derived from decoder 176 so that flip-flop 172 is activated to the set condition in response to the binary one Q output of flip-flop 158, as coupled through OR gate 173 and inhibit gate 174. Thereby, reprogramming unit 32 will respond to the least significant bit in data word 2 in the same manner as it responds to the first bit in data word 1.

In the manner described for data bit word 1, the twelve bits of data word 2 are serially loaded into the twelve stages of register 150 while storage register 90 is being incremented. When all of the twelve bits comprising data word 2 have been loaded into register 150, AND gate 178 again derives an output pulse. With data word 2 being loaded into memory 150, the 01 output of decoder 152 is set to a binary one level. The binary one level of the 01 output decoder 152 is combined with the output pulse of AND gate 178 in AND gates 184 and 185, whereby the pulses P12 and P11 are respectively derived at phases C1 and C2. Simultaneously with the derivation of the P11 pulse, AND gate 181 derives an output pulse to enable gates 186 and derive signal P15 as a binary one value. The P12 signal is fed to timing and control logic circuit 84 which responds thereto to supply a command to transfer circuit 82 for enabling the contents of instruction counter 88 to be loaded into address register 78. Thereby, the ten least significant bits of data word 1, designating the memory address 31, are fed to address register 78, where they are stored.

After address 31 has been loaded into register 74, the output pulse of AND gate 181 opens gates 186 so that the ten least significant bits of data word 2, as stored in the ten left stages of register 150, are fed to input-output register 76 through transfer circuit 82 under control of the P11 pulse, as coupled to circuit 84. The second data word, indicative of switch 92 in array 50, is now stored in input-output register 76 and is fed to address 31, determined by the contents of address register 78, in response to control network 80.

Simultaneously with the ten least significant bits of data word 2 being loaded into address 31 of memory section 74, the P11 and P15 pulses clear register 90 to an all zero state and increment counter 88 so that the counter is storing a signal commensurate with address 32.

The twelve bits of data word 3, designating gate 228 in array 50, are now serially applied to the twelve stages of buffer register 150 in the manner described in conjunction with the loading of the buffer register by data word 1. Simultaneously with each bit being loaded into buffer register 150, the count of register 90 is advanced, whereby AND gate 178 derives a pulse output after the twelve bits comprising data word 3 have been completely loaded into register 150. After the twelve bits comprising data word 3 have been loaded into register 150, the 01 output of decoder 152 is again activated to the binary one state whereby pulses P11, P12 and P15 are again derived. The ten least significant bits of data word 3 are fed to address 32, stored in instruction counter 88, in response to the P11, P12 and P15 pulses. After the ten least significant bits of data word 3 have been stored in address 32, instruction counter 88 is incremented to a count of 33 and regicster 90 is cleared.

Data word 4 is now fed into buffer register 150. After all twelve bits of data word 4 have been loaded into register 150, the 10 output of decoder 152 is derived as a binary one while AND gate 178 generates a binary one pulse, whereby AND gates 181–183 are energized, with the gate 182 being energized at phase C1 while gates 181 and 183 are energized at phase C2. The output of gate 182, signal P14, clears instruction counter 88 to a zero state, enabling the instruction counter to be responsive to a new address in a sequence. The new address at the beginning of the sequence is fed from the ten leftmost stages of register 150 in response to the output pulse of AND gate 81 enabling gates 186 to establish a signal path through transfer circuit 82 to instruction counter 88. Simultaneously, register 90 is being cleared in response to the P15 pulse.

In response to data word 5, the memory address indicated by data word 4, address 63, is loaded with a signal indicating gate 7 is to be activated in the manner indicated supra in conjunction with data word 2.

After data word 5 has been loaded into memory address 63, data word 6 is fed into buffer register 150. Each of the twelve bit positions of data word 6 has a binary zero value, but the ten most significant bits of data word 6 could have any value as they perform no function. Only the two least significant bits of data word 6 perform any useful function. In particular, the two least significant bits of data word 6 are detected by decoder 152, which derives a binary one on its 00 output. The 00 binary one output of decoder 152 is combined with the end of word pulse derived by AND gate 178 in AND gate 168, the output of which resets flip-flop 158. With flip-flop 158 reset, flip-flop 172 remains reset since the Q output of the former flip-flop remains at a binary zero level until another positive transition of the mode signal on lead 154 occurs.

After all of the data words have been loaded into memory section 74 in the manner indicated, the mode sidnal transmitted from the ground station is switched off, whereby the signal on lead 154 undergoes a negative going transition. The negative going transition on lead 154 activates reprogramming unit 32 to the verify state, whereby the contents of memory 36 are read out and transmitted back to the ground station a total of six times to provide an accurate comparison of the actual and desired contents of memory 36.

The trailing edge of the mode signal on lead 154 initiates the verify operation by being coupled through OR gate 194 to differentiating and detector network 196. Differentiating and detector network 196 responds to the negative going, trailing edge of the signal on lead 154 to derive a short duration, a synchronous negative pulse which is converted to a positive pulse by inverter 198. The output of inverter 198 is converted to a synchronous pulse by its connection through OR gate 164 to a synchronizer 162 and stretcher 200, which is substantially identical with stretcher 160.

The output of stretcher 200 is combined in AND gate 202 with the first of the two synchronized outputs of synchronizer 162. The output of AND gate 202 feeds the set input of verify flip-flop 204, whereby the Q output of flip-flop 204 can be activated to the binary one state. The binary one, Q output of flip-flop 204 is periodically read out at a frequency of 400 hertz, in response to a 400 hertz signal being applied to the trigger (T) input of flip-flop 204.

The Q output pulses of flip-flop 204 are derived as signal P17 that inhibits a significant portion of timing and control logic circuit 84. In addition, the P17 signal is fed to timing and control logic circuit 84 to enable the contents of instruction counter 88 so they can be fed through transfer circuit 82 to address register 78, in memory 36. The signal P17 also enables input-output resister 76 of memory 36 to read the memory contents and feed them through transfer circuit 82 to buffer register 40 in formatter 38, FIG. 2. The binary one P17 is also coupled to timing and control logic circuit 84 so that the gate/value bit fed by the logic circuit to buffer register 40 is activated to the value state. Thereby, the contents of buffer register 40 are fed directly through switch 56 to register 58 and can be transmitted directly to the ground station by way of multiplexer 26 and S-band transmitter 22. The P17 signals, which are derived at the same frequency as the frequency at which words are read from memory 36, are also fed to instruction counter 88 through timing and control logic circuit 84 so that the instruction counter is incremented by a count of one each time that a word is read from memory 36 during the verification mode.

The second synchronized output derived from synchronizer 162 is derived as signal P19. The P19 signal is a positive pulse, thereby, only at the beginning of the verify cycle. The P19 pulse is fed through timing and control logic network 84 to clear instruction counter 88 and counter 90 at the beginning of each verify cycle.

With reprogrammer 32 in the verify mode, wherein flip-flop 204 is set, one further function is performed. In particular, the count in register 90 is advanced by one each time that the contents of memory 36 have been completely read out. To this end, instruction counter 88 includes nine stages to accommodate a count of 512, a count equal to the number of words in memory 36. The most significant bit position of counter 88 thereby has a binary one to zero transition only after the last word in memory 36 has been read out. The one to zero transition of the most significant bit stage of counter 88 is detected by differentiator and detector network 207, which responds to the transition to feed a binary one signal to AND gate 206. AND gate 206 is enabled during the verify mode in response to the binary one Q output of verify flip-flop 204.

The binary one output derived from AND gate 206 after all of the contents of memory 32 have been read out is fed through OR gate 192 and is derived as signal P20. The P20 signal is converted into a relatively short duration pulse by differentiator 142 and fed through AND gate 140 to the increment input of storage register 90. AND gate 140 is simultaneously enabled in response to the binary one P17 signal, as coupled to the AND gate through OR gate 138. In response to the short duration pulse derived by AND gate 140, storage register 90 is advanced by a count of one each time that the contents of memory 36 have been read out during the verification cycle.

After the contents of memory 36 have been read out six times, reprogrammer 32 is deactivated from the verify state. To this end, the three least significant bit stages of register 90 are fed to count of six decoder 208. In response to a count of six being fed thereto, decoder 208 derives a binary one signal that is fed to the reset input of verify flip-flop 204. Thereby, verify flip-flop 204 no longer derives binary one signals on the Q output thereof in response to timing pulses fed to the trigger input circuit thereof. In the manner described, the contents of memory 36 are automatically read out six times after memory section 74 has been reloaded.

Occasionally, it is desired to read the contents of memory 36 without reloading section 74. To this end, a ground station transmits a verify signal to command the contents of memory 36 to be read out. The verify signal is a relatively short duration energy burst, which is converted into a relatively short duration pulse having positive leading and negative trailing edges, as derived on lead 157. The negative going trailing edge of the pulse on lead 157 is fed through OR gate 194 to differentiating and detector network 196 and thereby functions in exactly the same manner as the trailing edge of the signal on lead 154 to read the contents of memory 36 six times.

To provide a more complete understanding as to the manner by which the system functions while reprogrammer 32 is in the verify mode, a complete verify operating cycle will be considered. The cycle of operation is initiated in response to the derivation of an output pulse by inverter 198, in response to the mode signal or verify signal trailing edges. The signal derived by inverter 198 activates verify flip-flop 204 to the set state in synchronism with the first output signal of synchronizer 162. Immediately after flip-flop 204 has been activated to the set state, the second output of synchronizer 162 is derived, whereby the P19 signal is generated to clear instruction counter 88 and storage register 90 to the zero state.

After instruction counter 88 and storage register 90 have been cleared, a timing pulse is applied to the trigger input of verify flip-flop 204, whereby the P17 pulses are derived. The P17 signal is fed to timing and control logic circuit 84, so that the gate/value bit fed to buffer register 40 has a value state. Simultaneously, the P17 pulses cause the zero (000000000) count stored in instruction counter 88 to be fed through transfer circuit 82 to the input of register 78. Address register 78, by way of control circuit 80, energizes the word in memory 36 having the address of 000000000. In response to the P17 signal, timing and control logic circuit 84 also enables input-output register 76 at a time slightly after address register 78 was loaded. Simultaneously with energization of input-output register 76 to read the contents of an address in memory 36, transfer circuit 82 is energized by timing and control logic circuit 84 so that the contents of register 76 can be transferred to the ten most significant stages of buffer register 40. Buffer register 40 thereby responds to the word stored in address 000000000. The word at address 000000000 is read from buffer register 40 through switch 56 to shift register 58 under the control of the gate/value bit.

Simultaneously with input-output register 76 feeding the word at address 000000000 to transfer circuit 82, the P17 signal is fed through timing and control logic circuit

84 to the increment input of instruction counter 88. Thereby, instruction counter 88 is loaded with a count of 000000001. Instruction counter 88 remains at a count of 000000001 until the next 400 hertz signal is applied to the T input of flip-flop 204, at which time the 000000001 count in instruction counter 88 is fed to address register 78. Thereafter, input-output register 76 is enabled to read the word at address 000000001 in memory 36 and feed the contents of address 000000001 to buffer register 40. Simultaneously with input-output register 76 being activated to read the memory contents at address 000000001, instruction counter 88 is advanced to 000000010. In the manner described, the contents of the 512 stages of memory 36 are read out in sequence to buffer register 40 and from thence to transmitter 22.

After the contents of memory 36 have been completely read out once, instruction counter 88 is activated so that the most significant bit stage thereof is transferred from a one to a zero state. The one to zero transition of the most significant bit stage of counter 88 is detected by differentiating and detector network 207 which derives a pulse that is combined with the binary one Q output of verify flip-flop 204 and AND gate 206. The output of AND gate 206 is fed through OR gate 192 to increment the count stored in register 90 from a zero to one.

Instruction counter 88 now is again loaded with a 000000000 count so that the contents of memory 36 are again read out in the same manner indicated for the first readout cycle. Upon completion of the second readout cycle, a P20 signal is derived to advance the count stored in register 90 from one to two. Readout of memory 36 is repeated until a count of six has been attained by register 90. The count of six is detected by decoder 208 which resets flip-flop 204 to terminate the verify operation.

Figure 5:
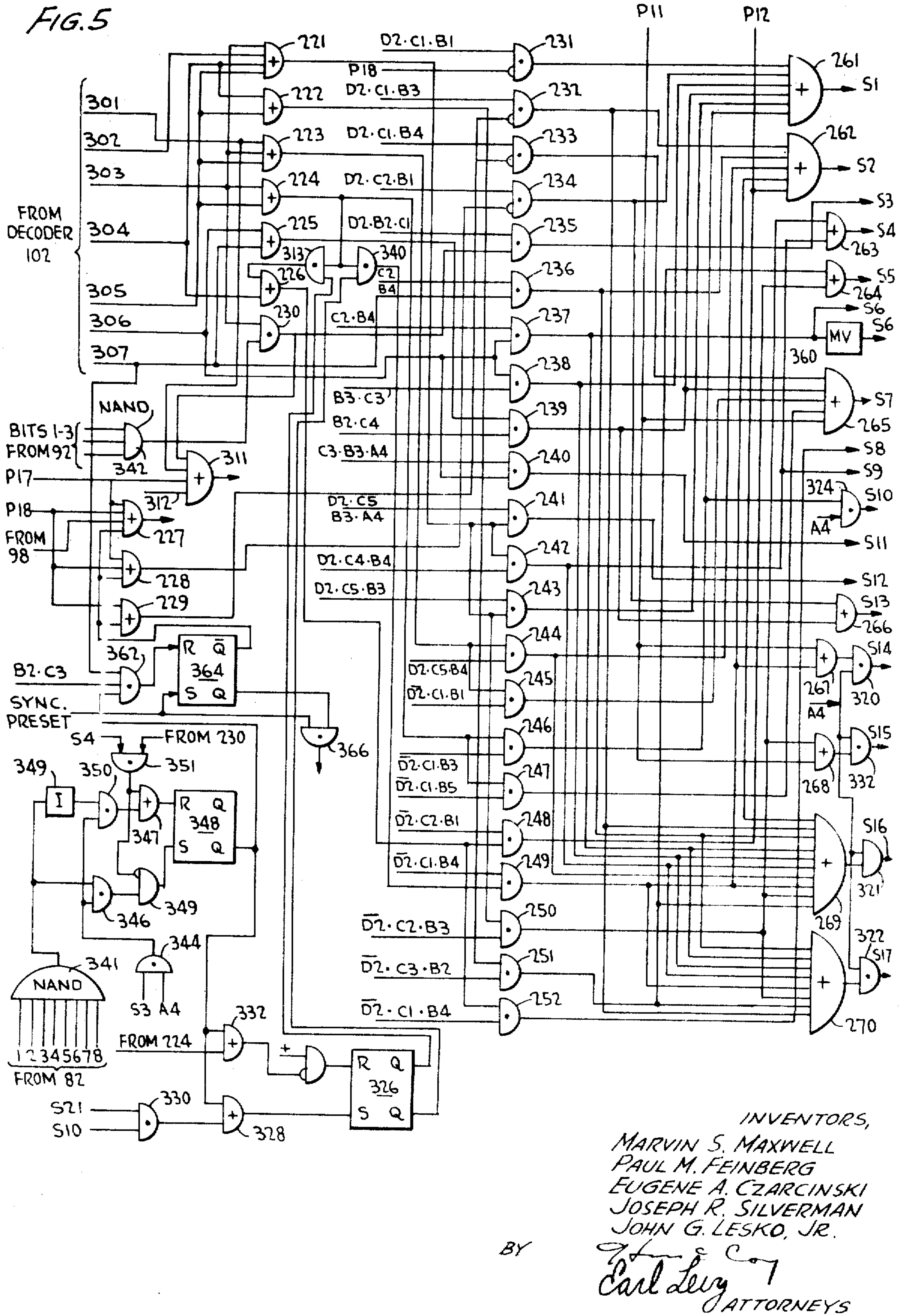
FIG. 5 is a circuit diagram of a portion of the memory sequencer of FIG. 3.

Reference is now made to FIG. 5 of the drawings, wherein there is illustrated a schematic diagram of timing and control logic circuit 84, included within memory sequencer 34. The broad function of timing and control logic circuit 84 in conjunction with the reprogramming and verify operating modes has been discussed supra. In addition, timing and control logic circuit 84, during normal operation when the memory is not being reprogrammed or verified, responds to words stored in memory to establish connections in response to the eight different command words. The specific connections established by timing and control logic circuit 84 in response to the command functions, as well as the circuits established during the program and verify modes, will now be discussed.

Circuit 84 is divided, inter alia, into three sets of gates, with the first set of gates comprising OR gates 221–229 and AND gate 230, the second set of gates comprising inhibit gates 231–234 and AND gates 235–252, while the third set of gates includes OR gates 261–270. The three sets of gates are interconnected with each other and additional circuit elements to selectively derive eighteen output signals, on output leads denominated as S1–S17 and $\overline{\textbf{S6}}$. The connections between the various gates and circuit elements are described infra, as the description proceeds, in conjunction with the various operating commands or codes, as well as the verify and program modes.

Gates 231–252, as well as other circuit elements in timing and control logic circuit 84, are responsive to periodically derived timing waveforms derived by clock source 136. In particular, timing and control logic circuit 84 is responsive to four clock pulse frequencies of 400 hertz, 800 hertz, 4 kilohertz and 20 kilohertz. The 400 hertz signal is derived as a two phase square wave clock, with the first and second phases being denominated as D2 and $\overline{\text{D2}}$. The 800 and 4000 hertz signals are both derived as five phase, rectangular wave signals having phases denominated respectively as C1, C2, C3, C4 and C5, and B1, B2, B3, B4 and B5. The 20 kilohertz timing signal has only a single phase, denominated as A4, and is utilized primarily for deriving short duration pulses from the various gates of FIG. 5.

The differently phased timing or clock signals at the different frequencies are combined in some of the gates of FIG. 5 to enable those gates to derive binary one signals in response to data inputs. The differently phased timing signals are derived in many combinations so that during predetermined intervals the timing signals have binary one values. For a signal of N phases, the binary one signal is derived with a duty cycle of $1/N$; thereby, for example, the signal C1 is derived during the first fifth or 50 microseconds of each 250 microsecond period of the 4 kHz. timing signal; signal C2 is derived in the interval between 50 and 100 microseconds of each 250 microsecond period of the 4 kHz. wave, etc. Only when each of the timing waveforms has a binary one value is a gate or circuit element responsive thereto enabled. The basic frequency at which a gate or circuit element is enabled is determined by the frequency of the lowest frequency timing signal applied thereto. For example, most of gates 231–252 are responsive to either the D2 or $\overline{D2}$ phase of the 400 hertz timing waveform and thereby are enabled once every 2.5 milliseconds.

The timing pulses are applied to gates 231–252 in a manner whereby each of the gates is enabled so that it can derive a binary one output once during each 2.5 millisecond period in the following sequence: gate 231; gate 235; gate 232; gate 233; gate 234; gate 242; gates 241 and 243 simultaneously; gate 244; gate 245; gate 246; gates 249 and 252 simultaneously; gate 247, gate 248; gate 250; and gate 251. In addition, some of the gates are enabled once every 1.25 milliseconds in a sequence in accordance with: gates 236 and 237 simultaneously; gates 238 and 240 substantially simultaneously, with the latter gate being activated in response to an A4 pulse; and gate 239.

Consideration will now be given to the manner by which timing and control logic circuit 84 responds to the different commands read from the words in memory 36. It is to be recalled that the commands are indicated by the fourth, fifth and sixth bits of each word read from memory, coded in accordance with seven of the eight different commands which the present invention can execute. The fourth through sixth bits of each word read from memory are fed to buffer section 92 of instruction register 96. Decoder 102 responds to the fourth through sixth bits to selectively activate one of seven output leads to a binary one state. The seven output leads of decoder 102 are fed to timing and control logic circuit 84, which interprets them and activates certain ones of output leads S1–S17 and $\overline{S6}$.

The seven outputs of decoder 102 are fed to timing and control logic circuit 84 on leads 301–307, which carry binary one signals in response to the instruction commands 1–7. Since certain of commands 1–7 cause the same operations to be performed, the signals on leads 301–307 are selectively combined in OR gates 221–226. To this end OR gate 221 is responsive to the binary one signals on leads 302, 303, 304 and 305; OR gate 222 is responsive to the binary one on leads 304 or 305; OR gate 223 is responsive to the binary one signals on leads 301, 303 or 305; OR gate 224 is responsive to the signals on leads 303 and 305; OR gate 225 is responsive to the signal on leads 306 and 307; and OR gate 226 is responsive to the signal on leads 302 and 304. In addition, OR gate 226 is selectively responsive to the signal on leads 303 or 305 as derived from OR gate 224 and fed through OR gate 311. The other input to OR gate 311 is discussed infra, in conjunction with operating codes or instructions three and five.

Prior to any of the eight commands being initiated, a word in memory 36 is fetched and the instruction code in bits four-six is read.

The first operation involved in fetching a word from memory 36 is to load address register 78 with a word indicating the program word, i.e., memory location, number (K), as derived from instruction counter 88, and simultaneously activate the read input of input-output register 76, whereby register 76 is loaded with the data word at address K. To these ends, timing and control logic circuit 84 derives binary one signals substantially simultaneously on the output leads S2, S16 and S17 thereof. The S2 signal is fed to transfer circuit 82, whereby the nine bit K address indicating word stored in instruction counter 88 is fed to the transfer circuit output bus. The word derived on the transfer circuit 82 output bus is fed to address register 78 since the load input thereof is activated in response to the binary one signal on lead S16. In response to the K address loaded in register 78, control network 80 retrieves the data in one of memory sections 72 or 74 and causes it to be fed to input-output register 76. Since the read input of register 76 has been enabled, the register responds to the word read from the selected location (K) in memory 36 and stores the data word.

The binary one signals are derived on leads S2, S16 and S17 in response to a timing output pulse normally developed once each 2.5 ms. interval in response to timing signals D2, C1 and B3. The output of gate 232 is fed through OR gate 262 to the S2 lead, while the binary one signals are derived on leads S16 and S17 by feeding the output of gate 232 through OR gates 269 and 270 to the inputs of AND gates 321 and 322 that are responsive to the A4 timing pulse.

After the contents of instruction counter 88 have been fed through transfer circuit 82 and while the transfer circuit is no longer responsive to the instruction counter word, the instruction counter is incremented by a count of one to $K+1$. To this end, the S7 output of timing and control logic circuit 84 is derived as a binary one signal which is fed through OR gate 130 to the increment input of instruction counter 88. The signal is derived on lead S7 in response to inhibit gate 233 deriving a binary one output signal in response to the timing waveforms D2, C1 and B4.

The next operation involved in the fetch instruction is to read the data word stored in input-output register 76, retrieved from the K memory address stored in instruction counter 88 prior to incrementing thereof, to buffer register 92 and NAND gate 100 so that the instruction code can be interpreted. To these ends, timing and control logic circuit 84 derives a binary one signal on the S1 output lead thereof, enabling the ten bit data word stored in input-output register 76 to be fed through transfer circuit 82. Simultaneously, a binary one signal is derived on output lead S13 of timing and control logic circuit 84, enabling buffer stages 92 and 98 of instruction register 96 to be respectively responsive to the six least significant bits of the word stored in register 76 and the output of NAND gate 100. The binary one signals on leads S1 and S13 are respectively derived from OR gates 261 and 266, both of which are driven by a binary one signal at the output of inhibit gate 234. Inhibit gate 234 is activated to the binary one state normally once during each 2.5 ms. time interval in response to the timing waveforms D2, C2 and B2.

After all of the operations for a particular command have been performed and immediately prior to the beginning of the next instruction fetch operation, the data word stored in input-output register 76 is read to the output bus of transfer circuit 82 and thence to a formatter buffer register 40. To this end, a binary one signal is derived on lead S1 at the output terminal of OR gate 261. The S1 signal is derived in response to inhibit gate 231 being responsive to the C1 and B2 timing pulses. The signal on lead S1 is fed to transfer circuit 82 to enable the word stored in register 76 to be read out to the transfer circuit output bus. The word on the transfer circuit output bus is fed to buffer register 40 which is enabled by the C1 and B2 timing pulses to be responsive to signals fed thereto so that the buffer register is loaded with the data word developed by memory sequencer 34 during the preceding 2.5 ms. period. Once formatter buffer register 40 has been loaded, the fetch operation for the next 2.5 ms. period is initiated and the cycle reoccurs. Since instruction counter 88 was incremented during the fetch operation, the next memory word is read from an address different from the preceding address.

Consideration will now be given to the manner by which network 84 responds to a command 0. It is broadly the function of a memory word containing a command 0 to activate one of the gates in matrix 50 at a rate of at least once per minor frame and to gate the data fed through the enabled gate in the matrix to register 58. The gate is matrix 50 that is selected is determined by the word in input-output register 76 that is fed through transfer circuit 82 to the ten least significant stages of buffer register 40 in formatter 38; the eleventh or gate/value bit in the buffer register is activated to the gate condition.

A word containing a command 0 includes a binary zero level in at least one of the four bit positions 7–10. During the fetch sequence, NAND gate 100 responds to the binary signals of bit positions 7–10 in the word read from memory address K. For a word specifying a command 0, gate 100 derives a binary one signal that is fed to and stored by buffer stage 98 until the next fetch operation occurs. The binary one output of buffer stage 98 is coupled through OR gate 227 in circuit 84 to an inhibit input of decoder 102 so that all of leads 301–307 are driven to the binary zero state while a command 0 is being performed. To enable switch 56 to be activated to pass the output of one of converters 52 or 60 when the command 0 word is read from register 40, the gate/value signal is derived as a binary zero. To this end, there is provided OR gate 311 which responds to a number of different input signals, described infra, none of which is in a binary one state while command 0 is normally derived.

Since no other operations occur in response to a command 0, input-output register 76 is loaded with the previously retrieved word from memory address K and the gate/value output of OR gate 311 derives a binary zero signal when the D2, C1 and B1 timing signal is derived to enable the inputs of register 40. During the next 2.5 ms. period while sequencer 34 is performing operations in response to the word read from the memory address $K+1$, the switch in matrix 50 designated by the word in memory address K is activated and the data fed through the selected switch is read out from either convertor 52 or 60 through switch 56 to register 58. Readout of converter 52 or 60 and activation of switch 56 are in response to the output signals of decoder 64 and the most significant bit, gate/value indicating, stage of register.

If, however, it is desired to read the words in the various locations of memory 36 to the ground station and enable sequencer 34 to perform its normal operation and thereby override the normal gate/value signal associated with the different commands so that the sequencer connections can be tested, the ground station transmits a command signal which is received and decoded by command and clock subsystem 20. Command and clock subsystem 20 responds to the signal from the ground to derive a binary one signal on lead 312 as long as it is desired to monitor the status of sequencer 34. In response to the derivation of a binary one signal on lead 312, a binary one output is derived from OR gate 311 and the gate/value signal is set to a binary one state.

In response to the binary one output level of OR gate 311, the gate/value bit stored in the most significant stage of buffer 40 commands switch 56 to be responsvie to the signals stored in the remaining stages of buffer register 40. Thereby, the operations of sequencer 34 can be checked without reading and sampling the data in sources 44, 46 and 48.

Consideration will now be given to command 1, utilized to gate synchronization, identification and other value words from a designated memory location to register 58. In general, a memory word at address K containing a command 1 activates sequencer 34 so that the contents of the next higher memory location $K+1$ are fed to the buffer input register 40 of formatting unit 38. In addition, the most significant bit in buffer register 40 is activated to a binary one state, whereby the remaining ten bits in the buffer register are fed directly through switch 56 to shift register 58. In other words, if the word read from memory location K contains the command 1, memory sequencer 34 reads the word in memory location $(K+1)$ to register 40 during a first 2.5 ms. interval. During the second 2.5 ms. interval, the word stored in register 40 is read through switch 56 to register 58 and during the following 2.5 ms. interval, the bits of the word are serially read from register 58 to a track of tape recorder 24. After the command 1 is executed, the next command is fetched from memory location $K+2$.

The apparatus included within timing and control logic circuit 84 for directing the remainder of the memory sequencer to execute command 1 and the manner by which the command is executed will now be described. In response to address K being read out and the fourth through sixth bits thereof including the command bits 001, decoder 102 is activated whereby a binary one signal is derived on lead 301. The output of decoder 102 is not inhibited since words containing a command 1 have in the bit positions 7–10 all binary one values. In response to the binary one signal at each of bit positions 7–10, NAND gate 100 derives a binary zero level that is stored in buffer stage 98. The binary zero signal stored in stage 98 is combined in OR gate 227 with other signals, described infra, none of which can have binary one levels during normal system operation. Thereby, the output of decoder 102 is fed to timing and control logic circuit. The output of decoder 102 is enabled in exactly the same manner for each of the other commands to be described, with the possible exception of command 7 which will be discussed infra.

For a command one, read from memory address K, the binary one signal level on lead 301 is fed through OR gate 223 to enable AND gates 244 and 245. AND gate 244 responds to the output signal of gate 233 and the timing signal D2, C5, B4, to activate each of gates 262, 269 and 270 to derive binary one signals. The binary one signal derived by gate 262 on lead S2 activates transfer circuit 82 so that the word stored in instruction counter 88, indicating memory address $(K+1)$ by virtue of the increment operation during the fetch sequence, is fed to the transfer circuit output bus.

While the $K+1$ address indicating the word stored in instruction counter 88 is supplied to the output bus of transfer circuit 82, binary one signals are derived on leads S16 and S17 in response to the A4 timing pulse. In response to the binary one pulses derived by leads S16 and S17, address register 78 is enabled and is therefore loaded with the word in instruction counter 88. Thereby, the address $(K+1)$ is fed into address register 78 and the data at address $K+1$ is loaded into input-output register 76.

After register 76 is loaded with the data at address $K+1$, gate 244 is disabled and gate 245 is enabled in response to the timing pulse $\overline{D2}$, C1, B1. In response to the $\overline{D2}$, C1, B1 timing pulse and the binary one signal applied thereto by OR gate 223, AND gate 244 derives a binary one signal that is fed through OR gate 265 to output lead S7. The signal on lead S7 is fed through OR gate 130 to increment instruction counter 88, whereby the instruction counter stores the address $K+2$.

During the entire 2.5 ms. interval while the command 1 is being executed, a binary one signal is applied to the input of OR gate 311 via lead 301. Thereby, the most significant bit stage of buffer register 40 is loaded with a binary one signal from OR gate 311 while the remaining stages of the buffer register are loaded with the word at location $K+1$ by input-output register 76. In response to the binary one signal in the most significant bit stage of buffer register 40, the word in the remainder of the buffer register is fed through switch 56 to shift register 58.

Many of the remaining commands, particularly commands 2 through 5, require the use of the eight scratch pad memories comprising memory section 70. Each of the eight words in scratch pad section 70 is considered as a separate counter and has one of the memory locations 0 through 7. The scratch pad counters in memory section 70 are utilized either as sequential counters or to assist in the generation of abitrary subcommutation sequences. The words in the scratch pad memory counters are fed thereto and developed during major and minor frames. In other words, memory words 0–7 comprising the eight scratch pad counters, are not initially loaded with data, nor are they supplied with data words during a reprogramming operation, but by the inherent capabilities of instructions 3 and 5 the scratch pad counters are self-initializing.

In commands 2 and 3, different scratch pad counters are selectively utilized to indicate the minor frame being processed and gate numbers in sequential subcommutated sequences. Scratch pad counter 0 stores a count indicative of the minor frame being processed, which typically runs between 0 and 79. Scratch pad counter 1 is employed to store addresses of gates in array 50 to be activated in sequence a plurality of times in each major frame, but less than once during each 0.2 second minor frame which includes 80 2.5 ms. periods, for example. For example, scratch pad counter 1 can store therein counts between 32 and 46 for the correspondingly numbered gates in array 50 which are responsive to single bit digital sources 46 numbered 0–14. Typically, it is desired to sample each of single bit digital sources 46 numbered 0–14 once every second, i.e., once every five minor frames.

The general procedure utilized to sample single bit digital sources 46 numbered 0–14 once every second is to load one of sections 72 or 74 with a command 3 at address K and to load at addresses $K+1$ and $K+2$ the high and low limit values of the gate numbers in the sequence; in the presently considered example the gates 32–46 in array 50 are respectively responsive to sources 46 numbered 0–14. In the three least significant bits of address K, there is an indication that scratch pad memory 1 is to be utilized. The word at address K also enables readout of the source 46 numbered 0 which is connected to the gate number 32 in array 50.

After the command 3 has been executed, the memory is stepped to location $K+3$ and the data word at that location is read out and processed. Scratch pad memory 1 is not utilized until the memory is stepped to a word containing the instruction or command 2. When a memory word containing a command 2 is reached scratch pad counter 1 has a count indicative of the second gate number in the sequential subcommutated sequence by virtue of an increment operation performed during the command 3. In the presently assumed example, scratch pad counter 1 stores a word commensurate with switch number 33 in array 50 when the command 2 word is reached. The word commanding activation of the switch numbered 33 is read out and the scratch pad counter is again incremented so that when the next command 2 word is retrieved from memory 36, the scratch pad counter 1 indicates that the third word in the sequential subcommutated sequence is to be read out.

The sequence proceeds in the manner stated in response to words containing command 2 until the command 3 specifying scratch pad counter 1 is again reached, which occurs at memory address K in the next minor frame. When the next command 3 is reached, the word stored in scratch pad memory counter number 1 is compared with the word at address $K+1$, to determine if the maximum count for the gates in the sequence has been reached. In the minor frame immediately after the frame initiating the sequential subcommutated sequence, the maximum count will not have been reached because the subcommutated sequence is utilized only for sampling gates at a rate less than once per minor frame. Hence, when the address K is reached in the minor frame immediately after the frame initiating the sequence, the count in scratch pad counter 1 is read out to activate one of the gates numbered 32–46 in matrix 50.

The sequence continues in the stated manner, until the count in scratch pad counter 1 exceeds or equals the maximum count at address $K+1$, at the time when the word at address K containing a command 3 is retrieved from memory. In the presently considered example, scratch pad counter 1 stores a count of 46 after five minor frames have been completed. The count of 46 in scratch pad counter 1 is compared with the count of 46 at memory address $(K+1)$ during the sixth minor frame when address K has been reached. In response to the comparison, scratch pad counter 1 is loaded with the minimum number in the sequence, at address $K+2$, and the sequence begins anew.

Consideration will now be given to the specific apparatus and sequence of operation utilized in achieving a command 2. For a command 2, the word read from memory 36 and stored in buffer register 92 has the fourth through six bits represented as 010. The 010 condition is detected by decoder 102 which derives a binary one signal on lead 302, whereby binary one signals are derived in sequence from each of AND gates 242, 241 and 243 (simultaneously) 252, 248 and 250, in the order named.

In response to the output signal of AND gate 242, binary one signals are derived at the outputs of OR gates 263, 269 and 270, and a binary one signal is derived on lead S9. The output signal of OR gate 263 is derived as a binary one signal on lead S4, while the signals derived from OR gates 269 and 270 are converted into relatively short duration pulses at the output of AND gates 321 and 322 in response to an A4 clock pulse.

The binary one signal derived on lead S4 is coupled to transfer circuit 82 to enable the three least significant bits in buffer register 92, indicative of the address of one of the eight scratch pad memories to be fed to the transfer circuit output bus. While the transfer circuit 82 output bus is carrying the address of the scratch pad memory, address register 78 and memory control circuit 80 are activated to the load and read conditions in response to the signals on leads S16 and S17. Thereby, address register 78 activates the designated scratch pad 70 memory word and enables it to be fed to input-output register 76, whereby register 76 is loaded with data indicative of the gate in array to be activated. While the scratch pad memory address is being fed through transfer circuit 82, the S9 signal is derived and fed through OR gate 134 to the clear input of temporary storage register 90. Thereby, register 90 is activated to a zero state while register 76 is being loaded with data indicative of the switch in array 50 which is to be enabled.

The next operation in command 2 involves the substantially simultaneous enabling of AND gates 241 and 243, with the former gate being enabled in response to timing pulses D2, C6, B3 and A4, and the latter being energized in response to D2, C5 and B3. In response to AND gate 243 being enabled, a binary one signal is fed to OR gate 261, whereby a binary one level is derived on lead S1. While the binary one level is being derived on lead S1, a short duration, binary one signal is generated by AND gate 241, whereby a short duration pulse is generated on lead S12. In response to the binary one level on lead S1, transfer circuit 82 is enabled to feed the data word in register 76 to the transfer circuit output bus. The word derived on the transfer circuit output bus, indicative of the data word stored in the selected scratch pad address, is fed to register 90, which is enabled in response to the binary one pulse on lead S12. Thereby, temporary storage register 90 is now loaded with the word in the selected scratch pad memory address, which word indicates the gate in array 50 to be activated.

The word stored in register 90 is now incremented and then fed back to the memory location in scratch pad 70 from whence it was originally withdrawn. Thereby, the next time that a command 2 is retrieved from memory 36, the next numbered switch in array 50 will be activated. To these ends, the next gate in logic circuit 84 to be enabled is AND gate 252 which is responsive to the timing pulses $\overline{D2}$, C1 and B4. The binary one signal generated by AND gate 252 is derived on lead S8 and fed through OR gate 95 to the increment input of register 90. Register 90 now stores a count indicative of the gate number stored in register 76 plus one.

The count now stored in register 90 is returned to the selected scratch pad word in memory 36 in response to binary one signals being derived on leads S5 and S14. In particular, binary one signals are derived on leads S5 and S14 in response to AND gate 248 being enabled by the timing waveforms $\overline{D2}$, C2 and B1. The resulting binary one signal derived at the output terminal of AND gate 248 is fed through OR gate 264 to lead S5 and through OR gate 267, the output of which is combined with an A4 timing pulse in AND gate 330. The short duration output pulse of gate 330 is fed to lead S14, which activates input-output register 76 to the load condition. In response to the S5 signal, transfer circuit 82 is enabled so that the word stored in register 90 is fed to the transfer circuit output bus. The word derived on the transfer circuit output bus is fed to input-output register 76 since the input-output register is activated to the load condition in response to the signal on lead S14.

The next operation is to load the word, indicative of the number of the next gate in the sequence to be activated, now stored in input-output register 76, back into the originally designated scratch pad memory location. To these ends, AND gate 250 is enabled in response to the $\overline{D2}$, C2 and B3 timing pulses. The resulting binary one signal at the output of AND gate 250 is fed to output leads S5, S15 and S16 via OR gates 264, 268 and 269, respectively. The output of OR gate 268 is combined with an A4 timing pulse in AND gate 332, as is the output of OR gate 269 in AND gate 321 to derive the S16 signal.

In response to the binary one level on lead S4, transfer circuit 82 is enabled to read the three least significant stages of buffer register 92, indicative of the scratch pad location designated by the previous word read from memory 36, to the transfer circuit output bus. While the transfer circuit output bus is responsive to the buffer register 92, the binary one signals on leads S15 and S16 are derived. In response to the signal on lead S16, address register 78 is loaded with the scratch pad memory location signal derived on the output bus of transfer circuit 82, while register 76 is activated to the write condition in response to the signal on lead S15. Thereby, the same scratch pad memory location as was previously read out in response to the presently considered command 2 is loaded with the number of the switch in array 50 which is one greater than the switch number which was read out in conjunction with the retrieved scratch pad memory location. The scratch pad location stores the new number until the next command 2 or 3 is derived designating the same scratch pad memory location. At that time, the designated scratch pad location is again incremented or reset and the cycle continues.

After all of the command 2 operations have been completed, the contents of input-output register 76, indicative of the gate number in array 50 equal to the number at the beginning of the command 2, are read out. Thereby, the word read from memory 76 controls activation of a gate in array 50 having a number equal to the number stored in the designated scratch pad location at the beginning of the just considered command 2.

Consideration will now be given to the apparatus in timing and control logic circuit 84 utilized to execute a command 3, as well as the operations involved in the command. Initially, consideration will be given to the manner by which command 3 functions in conjunction with the sequential subcommutation sequences, as mentioned supra with regard to command 2. Command 3 serves the additional functions of: activating scratch pad counter 0 to indicate the minor frame number being processed, enabling the two program X bits to be read out for program identification purposes at the ground station; and activating each of the other scratch pad counters to the initial count thereof at the beginning of each major frame. Discussion of the aspects associated with resetting the other scratch pad counters will be made after consideration is given to the manner by which command 3 generates sequential subcommutation sequences in conjunction with command 2.

For a memory word including a command 3, the fourth through sixth stages of buffer register 92 respectively derive the binary output signals 110. The signals derived by register 92 are fed to decoder 102 which responds thereto to derive a binary one signal on lead 303. The binary one signal on lead 303 is fed to each of OR gates 221, 223, 224 and AND gate 230. The manner by which AND gate 230 functions in response to the signal on lead 303 is discussed infra in conjunction with activation of scratch pad counter 0, which stores a count indicative of minor frame number.

AND gate 242 responds to the binary one output signal of OR gate 221 and the timing pulses D2, C4 and B4 to derive a binary one signal that is fed to each of OR gates 263, 269 and 270, as well as to output lead S9. OR gates 263, 269 and 270 respond to the binary one signal to generate binary one output signals on leads S4, S16 and S17, the latter two leads being responsive to the A4 timing pulse fed to AND gates 321 and 322. In response to the signal on lead S4, transfer circuit 82 is activated whereby the scratch pad memory address stored in the 3 least significant bit stages of register 92 is fed to the transfer circuit output bus. While the designated scratch pad memory location is being applied to the output bus of transfer circuit 82, the S16 and S17 signals are derived to enable address register 78 to be loaded with the scratch pad address and to activate register 76 so that it is loaded with the data at the designated scratch pad address.

After register 76 has been loaded with the data at the designated scratch pad location, gates 243 and 241 are energized substantially simultaneously, with the former gate being responsive to the timing voltages D2, C5 and B3 and the latter being responsive to timing waveforms D2, C4, B3 and A4. In response to the activation of AND gate 243, a binary one signal is fed to the input of OR gate 261, whereby the S1 signal is derived as a binary one value. While the S1 lead carries a binary one signal, AND gate 241 is activated by the A4 timing pulse, whereby a short duration binary one signal is derived on lead S12. In response to the signal on lead S1, transfer circuit 82 is activated to be responsive to the word, indicative of the data in the designated scratch pad memory, stored in register 76. While the output bus of transfer circuit 82 is carrying the data at the designated scratch pad memory location, the S12 signal is derived via lead 120 to enable register 90 so that it stores the switch number indicating word at the designated scratch pad location.

Next, AND gate 244 is enabled in response to the D2, C5, B4 timing pulses whereby binary one signals are derived at the outputs of OR gates 262, 269 and 270. The binary one signals at the outputs of OR gates 262, 269 and 270 are transformed into binary signals on leads S2, S16 and S17, the latter two signals being derived as short duration pulses. In response to the binary one signals on leads S2, S16 and S17, the data word at memory address $(K+1)$, indicative of the maximum count, i.e., gate number, in the sequence, is fed to input-output register 76. The data word is taken from address $K+1$ because instruction counter 88 is incremented by a count of one during the fetch operation, immediately after register 76 receives the data word at memory location K.

The $K+1$ address stored in counter 88 is fed through transfer circuit 82 in response to the transfer circuit being activated by the S2 signal. While the K+1 address is being derived on the output bus of transfer circuit 82, the S16 and S17 signals are derived, whereby address register 78 is loaded with the $K+1$ address and the data at the $K+1$ address are read into input-output register 76 in response to the S17 signal.

AND gate 245 is next activated in response to the timing waveforms $\overline{D2}$, C1 and B1. The resulting binary one output of AND gate 245 is fed through OR gate 265, whereby a binary one signal is developed on lead S7. The binary one signal on lead S7 is fed through OR gate 130 to the increment input of instruction counter 88, whereby the instruction counter is loaded with the memory address $K+2$, where the lowest number in the sequence is stored.

After counter 88 has been advanced to the address $K+2$, AND gate 246 derives a binary one output in response to the timing waveforms $\overline{D2}$, C1 and B3 and the output of OR gate 224. The binary one signal derived by AND gate 246 is fed in parallel to OR gate 261 and AND gate 324, the latter also being responsive to the A4 timing pulse. The binary one signal derived on lead S10 in response to energization of gate 324 enables the output signal of comparison matrix 112 to be fed to circuit 84, while the signal derived from gate 261 on lead S1 enables the word stored in the input-output register 76, indicative of the maximum count in the sequence at memory location $K+1$, to be fed to the output bus of transfer circuit 82. Comparison matrix 112 responds to the words in register 76 and 90, respectively indicative of the maximum count in the sequence and the count in the designated scratch pad location, to derive a binary one signal if the register 90 word is greater than the word fed by input-output register 76 to the output bus of transfer circuit 82. In an opposite manner, comparison matrix 112 derives a binary zero level in response to the word in register 90 being less than or equal to the word on the output bus of transfer circuit. Hence, only if the maximum limit in the sequential subcommutated sequence has been exceeded, matrix 112 generates a binary one output.

In response to the S10 signal being derived. the signal generated by comparison matrix 112 is fed to flip-flop 326, where it is stored throughout the remainder of the command 3 operation. To these ends, the output signal of comparison matrix 112 is fed through AND gate 330 and OR gate 328 to the set input of flip-flop 326 in response to the S10 lead feeding a binary one signal to the other input of AND gate 330. In response to the binary one signal being applied to the set input of flip-flop 326, the flip-flop is activated whereby binary one and zero levels are respectively derived on the Q and $\overline{Q}$ outputs thereof. Flip-flop 326 remains in the set state until the command 3 operation has been completed. Upon completion of the command 3, the binary one signal derived from OR gate 224 which feeds one input of OR gate 332, changes to a binary zero level. The resulting binary zero output of OR gate 332 is fed to the inhibit terminal of gate 334, whereby gate 334 passes the positive voltage on its other input terminal to the reset input of flip-flop 326. In response to the positive voltage derived by gate 334 upon completion of the command 3 operation, flip-flop 326 is reset and binary zero and one levels are derived on the Q and $\overline{Q}$ outputs of the flip-flop.

The Q and $\overline{Q}$ outputs of flip-flop 326 are fed to the remainder of circuit 84 only while commands 3 and 5 are being executed. To this end, AND gates 313 and 340 are respectively connected to the Q and $\overline{Q}$ outputs of flip-flop 326 and both AND gates are responsive to the output of OR gate 224, having inputs responsive to the signals on leads 303 and 305. Thereby, for commands other than 3 and 5, the outputs of flip-flop 326 are disabled since AND gates 313 and 340 derive binary zero levels. AND gates 313 and 340 respond to the inputs thereof so that AND gate 313 derives a binary one signal only when a binary zero is derived by comparison matrix 112, while a binary one signal is derived from AND gate 340 in response to a binary one being derived by the comparison matrix. The binary one signals are selectively derived from AND gates 313 and 340 between the derivation of a binary one signal on lead S10 and the completion of the command 3 or 5 sequence of operations.

From the foregoing, if the maximum count of a sequential subcommutated sequence controlled by command 3 has been reached or exceeded, gate 340 derives a binary one signal, while a binary one is derived from gate 313 for the opposite condition. The binary one signal derived from gate 340 indicates that the switch in matrix 50 to be activated for the presently considered command 3 sequence is the lowest numbered switch in the sequence, as indicated by the word at address $K+2$. In contrast, if a binary one is derived from gate 313, the next switch in matrix 50 to be activated is the number in the scratch pad counter designated by the word at location K.

AND gate 249 responds to the binary one output signal of AND gate 340 and the $\overline{D2}$, C1 and B4 timing pulses to derive a binary one signal. Thereby, a binary one signal is derived by AND gate 249 during command 3 only if the data word stored in the designated scratch pad memory location, indicative of the count reached in the sequence, is greater than or equal to the data at memory location $K+1$ loaded with the highest word in the sequence. In response to a binary one signal derived at the output lead of AND gate 249, each of OR gates 262, 269 and 270 derives a binary one signal which is reflected into binary one signals on each of leads S2, S16 and S17, the latter two leads deriving the binary one levels as short duration pulses. The binary one signal on lead S2 enables transfer circuit 82 so that the memory address $K+2$, now stored in instruction counter 88 is fed to the transfer circuit output bus. While the transfer circuit 82 output bus is deriving a signal indicative of the address $K+2$, the S16 and S17 signals are derived, to enable address register 78 to be loaded and activate register 76 to the read condition. Thereby, register 76 now stores the word at memory location $K+2$, the data word of the lowest gate number in a sequence.

The next operation occurs in response to the timing waveforms $\overline{D2}$, C1 and B5. In response to said waveforms being derived, AND gate 247 responds to the output of OR gate 224 to supply a binary one signal to OR gate 264, whereby lead S7 carries a binary one signal. In response to the binary one signal on lead S7, a binary one signal is fed through OR gate 130 to the increment input of instruction counter 88, whereby the instruction counter is activated to the memory address word $K+3$. The address $K+3$ stored in counter 88 is indicative of the memory location to be read out during the next fetch operation.

With a binary one signal derived from AND gate 340, the next command 3 operation is enabling of AND gate 250 in response to the output of OR gate 221 and the timing voltages $\overline{D2}$, C2 and B3. In response to a binary one signal being derived by AND gate 250, each of OR gates 263, 268 and 269 derives a binary one signal. In response to the output of OR gate 263 a relatively long duration binary one level is derived on lead S4, and short duration binary one signals are derived on leads S15 and S16. In response to the signal on lead S4, transfer circuit S2 is activated so that the scratch pad address designated by memory location K, stored in the three least significant stages of register 92, is fed to the output bus of transfer circuit 82. With the scratch pad address derived on the output bus of transfer circuit 82, binary one signals are derived on the S15 and S16 leads to cause the contents of input-output register 76 to be written into the designated scratch pad address. Since register 76 is loaded with the data word at memory location $K+2$, the data word commensurate with the first switch number in a sequence, the designated scratch pad counter is loaded with the first word in sequence and this switch is read out at the completion of the command 3.

In response to a command 2, the designated scratch pad memory location is advanced in the manner indicated supra. The scratch pad memory is also advanced when a command 3 is derived if the upper limit of the sequence, as stored at each $K+1$ address immediately following a command 3K address has not been reached. The latter condition is achieved during minor frames of the subcommutated sequence. For example, if a subcommutation sequence includes the fifteen consecutively numbered switches or gates 32–46 in array 50, and three of the gates are read out during each minor frame, five minor frames are required to read out all of the gates in the sequence. Thereby, during the first minor frame when a command 3 is reached, the sequence is initiated. In the next minor frame, however, when a command 3 for counter 1 in scratch pad section 70 is reached, all of the gates in the sequence have not been read out so that a signal is derived to increment by one the count stored in the scratch pad memory, in a manner similar to a command 2 operation. However, it is necessary to skip two places in memory under these conditions so that none of the data at memory locations K1 and K2, commensurate with the final and starting gate numbers of the sequence, are read out to formatter 38.

Consideration will now be given to the operations performed in response to a binary one signal being derived by AND gate 313, which occurs in response to the gate number in the selected scratch pad memory, as stored in register 90, being less than the largest gate number in a sequence, the data at address $K+1$, as stored in input-output register 78. For the stated conditions, the first five operations in command 3 are identical with those operations described supra in conjunction with comparison matrix 112 deriving a binary one output signal. In response to the comparison matrix 112 deriving binary zero output signal the $\overline{Q}$ output of flip-flop has a binary one value so that a binary one signal is derived by AND gate 313, the output of which enables AND gate 252. AND gate 252 is responsive to the $\overline{D2}$, C1 and B4 timing waveforms, whereby there is derived a binary one level on lead S8. The binary one level on lead S8 increments register 90 by a count of one. Prior to incrementing, register 90 previously stored the last data word to be read from the designated scratch pad address, which word is commensurate with the number of the last gate in matrix 50 activated in the sequence. After the incrementing operation, register 90 stores the number of the next gate in matrix 50 to be enabled.

The next operation involves incrementing instruction counter 88 in response to the binary one signal developed on lead S7. The binary one signal is developed on lead S7 in exactly the same manner as described supra in conjunction with comparison matrix 112 deriving a binary one signal.

Following instruction counter 88 being incremented to the address $K+3$, the binary one output level of AND gate 340 is fed through AND gate 248, enabled in response to the $\overline{D2}$, C2 and B1 timing voltages. In response to the binary one signal derived by AND gate 248, a short duration binary one signal is derived by AND gate 330 on lead S14 while a binary one signal is being derived by OR gate 264 on output lead S5. In response to the signal on lead S5, transfer circuit 82 is enabled to read the data word stored in register 90, indicative of the number of the next gate in matrix 50 in the sequence, to the transfer circuit output bus. While the word from register 90 is being fed through transfer circuit 82, the S14 signal is derived, whereby input-output register 76 is loaded with a data word indicative of the next gate in matrix 50 to be read out.

The penultimate operation associated with command 3 involves deriving binary one signals on each of leads S4, S15 and S16 in response to AND gate 250 being enabled, as indicated supra. In response to these signals, the designated scratch pad memory location is loaded with a data word commensurate with a number one less than the number of the switch in matrix 50 which is to be next activated in response to the next word including command 2 and the same designated scratch pad memory being retrieved from a memory address.

The operating mode described for command 3 is applicable for each of the scratch pad counters, with the exception of scratch pad counter 0 and for loading the scratch pad counters during the initial minor frame in each major frame.

Simultaneously with readout of the word in input-output register 76 to formatter buffer register 40 at the end of each 2.5 ms. interval when a command 3 is being executed in conjunction with scratch pad counter 0, a signal indicative of the program number is derived from the two X bits. Thereby, the ground station is apprised of the program being executed once during each minor frame. To enable the program number and minor frame number indications to be derived simultaneously, the number of minor frames is limited to 256 so that only the eight least significant bits of scratch pad counter 0 can have binary ones therein and the other stages of the counter are zero. The two program indicating bits are derived in the places not occupied by the minor frame indicating bits while the scratch pad counter 0 is being read out.

To perform these operations, after each of the previously mentioned command 3 operations has been performed, AND gate 235 is selectively enabled in response to the D2, C1 and B2 timing waveforms. Enabling of gate 235 occurs simultaneously with the S1 pulse being derived from OR gate 261 to enable buffer register 40 in formatter 38 to be responsive to the minor frame number indicating signal. During this operation instruction register 96 still stores the command 3 from the previous operation, whereby a binary one signal is derived by decoder 102 on output lead 303 and the three least significant stages of register 92 are all loaded with binary zeros. The binary one signal on lead 303 is fed to AND gate 230, the other input of which is responsive to the output of NAND gate 342. NAND gate 342 is responsive to the three least significant bits derived from address register 92 and thereby derives a binary one signal when scratch pad memory zero is being utilized. The binary one signal derived from NAND gate 342 is combined in AND gate 230 with the binary one level on lead 303, whereby a binary one level is derived on lead S3. In response to the binary one signal on lead S3, the two X bits are fed through the two most significant bit stages of transfer circuit 82. The remaining eight bits of transfer circuit 82 are simultaneously responsive to the contents of scratch pad counter 0, as stored in input-output register 76. Thereby, when the command 3 for scratch pad memory 0 is complete, buffer register 40 stores in the first eight stages thereof a signal indicative of the number of the minor frame being processed and in the next two bits a signal commensurate with the number of the program being executed.

The signal stored in register 40 in response to a word designating command 3 and scratch pad memory 0 is read directly to register 58 through switch 56, a result achieved by loading the most significant bit stage of register with a binary one. To this end, the output of AND gate 230 is fed to an input of gate/value OR gate 311 so that the OR gate output is set to a binary one level. In response to the binary one output of OR gate 311, formatter 38 is energized so that the minor frame number indicating signal fed to register 40 at the completion of the command 3 operation is fed directly through switch 56 to register 58.

For each command 3 read from memory 36 during the initial minor frame of each major frame, except the word designating scratch pad 0, each of the scratch pad memory sections is loaded with a count indicative of the lowest gate number in a sequence, as indicated by the word at an address two words removed from the command 3 indicating address. To this end, flip-flop 326 is activated to the set state during the entire initial minor frame of each major frame so that while a command 3 or 5 is being executed the system functions in the same manner as when the output of comparison matrix 112 is a binary one, to signify that a sequence has reached or exceeded a maximum value. Flip-flop 326 is activated to the set state after the zero scratch pad location in memory section 70 has been read out during the initial minor frame and remains in the set state throughout the remainder of the initial minor frame until the 0 scratch pad counter is again reached in the second frame; the 0 scratch pad counter is programmed before any of the other counters is activated during any particular minor frame.

To maintain flip-flop 326 in the set state throughout the initial minor frame of each major frame, flip-flop 348 is provided. Flip-flop 348 is activated to the set state once each major frame in response to scratch pad counter 0 being employed and storing a count of zero to indicate that the initial minor frame is being executed. To this end, the set input of flip-flop 348 is driven by the output of inhibit gate 349, which in turn is responsive to AND gate 344 that is fed by NAND gate 341 and AND gate 344. NAND gate 341 is responsive to the eight least significant bits fed through transfer circuit 82, while AND gate 344 is driven by an A4 timing pulse and the signal on lead S3. A binary one signal is derived on lead S3 in response to the output of AND gate 235 once each major frame when the memory word includes a command 3 and specifies scratch pad counter 0 and timing pulses D2, B2 and C1 are derived, which events occur simultaneously with readout of register 76 to buffer register 40. The binary one output signal of AND gate 344 enables AND gate 346 to determine if the word read out of scratch pad counter 0 has a zero value, to indicate the initial minor frame. If the 0 scratch pad counter word has a zero value, a binary one is derived from NAND gate 341 and fed through enabled AND gate 346 to the set input of flip-flop 348.

Flip-flop 348 remains in the set state until the next minor frame the word read from memory contains a command 3 and specifies scratch pad counter 0, i.e., the flip-flop remains in the set state during the entire initial minor frame. To these ends, flip-flop 348 is activated to reset state in response to the simultaneous occurrence of binary one signals on lead S4 and at the output of AND gate 230, as detected by AND gate 350. The next time AND gate 230 derives a binary one output is when command 3 and scratch pad counter 0 are specified by the memory word in the next minor frame. The signal on lead S4 has a binary one signal at the beginning of each command 3 operation. Thereby, a binary one output is generated by AND gate 350 to reset flip-flop 348 the next time immediately after the fetch operation for the memory location storing a command 3, scratch pad counter 0 designation in the second minor frame.

Flip-flop 326 is activated in response to the signal stored by flip-flop 348 and the output of comparison matrix 112 so that flip-flop 326 is in a set state if flip-flop 348 is in the set state or a binary one is derived from the comparison matrix while words with commands 3 or 5 are being processed by the memory sequencer. In particular, the Q output of flip-flop 348 is fed to the set input of flip-flop 326 through OR gate 328, together with the comparison indicating signal derived from AND gate 330. Flip-flop 326 is activated to the reset input in response to the positive voltage normally fed through inhibit gate 334. To enable flip-flop 326 to be activated to the set state in response to the output of comparison matrix 112, gate 334 is inhibited during commands 3 and 5 by virtue of the output of OR gate 224 being fed through OR gate 332 to the inhibit input of gate 334. To prevent resetting of flip-flop 326 while flip-flop 348 is set, the Q output of the latter flip-flop is fed to the inhibit input of gate 334 by way of OR gate 332.

Consideration will now be given to commands 4 and 5 which are utilized to generate arbitrary subcommutated sequences, i.e., sequences wherein switches in array 50 are activated less than once per minor frame and the numbers of the switches activated are not in order. For example, for a first command 4, switch number 23 in matrix 50 may be activated; for a second command 4, switch number 223 may be activated, etc.

Indirect addressing is the basic approach utilized for generating the arbitrary subcommutated sequences. The numbers of the gates in matrix 50 to be activated are stored at consecutively numbered memory addresses, denominated Y. The data words at addresses Y are reached with the aid of one of the scratch pad memory counters, N, that stores indications of the last Y memory address read out. The memory word at address K specifying a command 4 or 5 designates that scratch pad counter N is to be utilized and activates sequencer 34 so that the data at the Y address specified by counter N are read out to formatter 38. After each Y address is read out from the designated memory location, the scratch pad counter is incremented so that the sequence continues in order. Commands 4 and 5 are arranged in a manner somewhat similar to commands 2 and 3 in that commands 4 and 5 direct the program to a specified Y address in sequence, while the two memory words immediately after the word containing a command 5 indicates the initial and final Y addresses.

Consideration will now be given to the specific operations and apparatus utilized in carrying out a command 4.

In response to the word read from memory section 72 or 74 having the fourth through sixth bits respectively being the binary levels 100, decoder 102 feeds a binary one level to lead 304. In response to the binary one level on lead 304, each of OR gates 221, 222 and 226 derives a binary one output signal. In response to the output signal of OR gate 221, each of AND gates 241–243 and 250 is enabled, while AND gate 251 is enabled in response to the output of OR gate 222 and each of AND gates 248 and 252 can be activated to the binary one state in response to the binary one output of OR gate 226. It is noted, therefore, that all of the AND gates that were activated for command 2 are energized for command 4 and that a binary one is derived from gate 251. Gate 251 is enabled by the $\overline{D2}$, C3 and B2 timing pulses after all of the command 2 operations have been completed. Since the connections at the outputs of gates 241–243, 248, 250 and 252 are identical with those described supra, there is no need to discuss them further. The connections to the outputs of gate 251 are described infra, when the last operation in command 4 is considered.

During the first operation in executing a command 4 code after a word containing a command 4 has been fetched from memory, binary one signals are derived on each of leads S4, S9, S16 and S17. In response to the binary one levels on leads S4, S16 and S17, the scratch pad address N designated by the word in the three least significant stages of buffer register 92 is loaded into address register 78 and the last Y address word to be read out, stored at the scratch pad address N, is read into input-output register 76. Simultaneously, the binary one signal on lead S9 clears register 90 to a zero state.

For the next command 4 operation, binary one signals are derived on leads S12 and S1. In response to the binary one signals on leads S1 and S12, the scratch pad data word, indicative of address Y, now stored in register 76 is fed through transfer circuit 82 to temporary storage register 90. Next, the data word now stored in register 90 is incremented by a count of one to $Y+1$ in response to a binary one signal being derived on lead S8. Following the incrementing operation, the data word indicative of $Y+1$ now stored in register 90 is transferred back into input-output register 76 in response to binary one signals derived on leads S5 and S14. In response to the S5 signal, transfer circuit 82 feeds the $(Y+1)$ indicating data word in register 90 to input-output register 76 which is activated to a load state in response to the binary one output level on lead S14.

The next operation involves loading the $(Y+1)$ indicating data word now stored in register 76 back into the scratch pad address N designated at the beginning of the command 4 operation in response to the binary one levels derived on leads S4, S15 and S16. In response to the signals on leads S4 and S16, transfer circuit 82 feeds the three least significant stages of register 92, indicative of the initial scratch pad address, N, to address register 78, while input-output register 76 is activated to the write state in response to the binary one signal on lead S15. Thereby, the specified scratch pad address of memory section 70 is loaded with a data word having a count commensurate with the memory address $Y+1$. Hence, address register 78 is now loaded with a word indicative of the memory address that contains the number of the next gate in array 50 to be activated.

The next operation is to read the data word indicative of the next gate in matrix 50 to be enabled, as stored in address $Y+1$, into input-output register 76. To this end, AND gate 251 is activated in response to the $\overline{D2}$, C3 and B2 timing voltages, whereby there is fed to each of OR gates 264, 269 and 270 a binary one signal. In response to the binary one signals fed to OR gates 264, 269 and 270, binary one signals are derived on each of leads S5, S16 and S17, whereby address register 78 is loaded with the address $Y+1$. In response to the binary one level on lead S17, input-output register 76 is loaded with the memory word at address $Y+1$. As the command 4 is being completed, therefore, register 40 is fed with a data word at address $Y+1$ indicative of a gate number in matrix 50 to be opened and scratch pad counter N is loaded with a count of $Y+1$.

Consideration will now be given to the operations performed during a command 5. A memory word having an address K indicating a command 5 is followed by first and second memory words at addresses $(K+1)$ and $(K+2)$ representing the highest and lowest memory positions in an arbitrary subcommutated sequence. Because of this factor it is necessary, after a command 5 has been executed, to jump three places in memory so that the next word is read from memory address $K+3$.

It is necessary to test each command 5 operation to determine if the data word derived from the memory address Y designated by the specified scratch pad counter is derived from an address equal to or greater than the highest memory address reserved for the arbitrary subcommutation sequence. If the scratch pad counter address indicating word is less than the maximum memory address indicated by the word at address $K+1$, the sequence continues in a manner similar to a command 4; if the scratch pad counter stores a number equal to or greater than the maximum address in the sequence, the switch number indicating data word at the lowest Y memory address in the memory address sequence, as indicated at the address $K+2$, is read out.

In response to the word retrieved from memory section 72 or 74 having a command 5, the fourth through sixth stages of buffer register 92 respectively derive binary signals of 101. The 101 signals derived by the fourth through sixth stages of register 92 are detected by decoder 102 which generates a binary one level on lead 305, whereby each of OR gates 221, 222, 223 and 225 is activated to derive a binary one signal level. The binary one signal level derived by OR gate 225 is fed to AND gates 313 and 340, respectively responsive to the less than and equal to or greater than output signals derived by AND gates 338 and 336. The signals derived by gates 221, 223, 225, 311 and 340 cause the same sequence to be derived as for a command 3 instruction. After these operations have been completed, the output of OR gate 222 is fed through AND gate 251 that is enabled in response to the $\overline{D2}$, C3 and B2 timing signals. Since, therefore, all of the connections involved in the command 5 sequence have been considered previously, the description thereof will not be reconsidered but attention will be directed to the functional operations.

For the first operation involved in command 5 after the fetch sequence has been completed, binary one signals are derived on each of leads S4, S9, S16 and S17. The binary one signal on lead S4 enables transfer circuit 82 to be responsive to the three least significant bits of the word stored in register 92, which bits indicate the address of a scratch pad memory counter N utilized in conjunction with command 5. Scratch pad counter N stores the memory address Y where the number of the last gate in matrix 50 to be activated during the arbitrary subcommutation sequence is stored. In response to the binary one levels on leads S16 and S17, the scratch pad address N is loaded into address register 78 and the data word indicating memory address Y at scratch pad address N is loaded into register 76. Simultaneously, the binary one signal on lead S9 clears temporary storage register 90 to the binary zero state.

The next operation involved in command 5 is to load register 90 with the memory address Y stored in input-output register 76. To perform this operation, a binary one is generated on each of leads S12 and S1, to respectively enable transfer circuit 82 to feed the contents of register 76 to its output bus and enable register 90 to be loaded in response to the transfer circuit output bus word.

The next operation in the command 5 sequence is to load the memory address $(K+1)$ now stored in instruction counter 88 into address register 78 and read the contents of address $(K+1)$ into input-output register 76, whereby register 76 stores a signal indicative of the upper value for address Y. These operations are performed by deriving a binary one signal on each of output leads S2, S16 and S17. In response to the signal on lead S2, transfer circuit 82 is enabled so that the output bus thereof carries the address $K+1$ stored in instruction counter 88; the $K+1$ word is fed to address register 78 under the control of the signal on lead S16. Simultaneously, a binary one signal is derived on lead S17 to activate input-output register 76 to the read state so that it stores the maximum value of Y, the word at address $K+1$.

The next operation is to increment instruction counter 88 so that it stores the address of the memory word displaced by two memory words from the original word fetched from memory, i.e., the memory word at location $K+2$. At memory location $K+2$, is stored a word having a value indicative of the lowest Y address word in the arbitrary subcommutated sequence. To these ends, a binary one signal is derived on lead S7 to increment instruction counter 88 from a count of $(K+1)$ to $(K+2)$.

The next operation is to determine if the contents of register 90, indicative of the maximum Y address in the arbitrary subcommutated sequence, are greater than the actual Y address stored in input-output register 76. It is to be recalled that the word in register 76 was previously retrieved from the scratch pad assigned to command 5 and is indicative of the memory word address which was read out the last time the command 4 or 5 for the designated scratch pad memory was performed. To these ends, binary one signals are derived on leads S1 and S10, whereby the maximum Y address indicating word stored in input-output register 76 is fed through transfer circuit 82 and compared in matrix 112 with the actual Y address indicating word in register 90. Simultaneously, the S10 signal is derived and combined with the output of matrix 112 in AND gate 330. If the contents of register 90 are equal to or greater than the word in register 76, a binary one level is derived from AND gate 330, while the AND gate derives a binary zero state if the word in register 90 is less than the input-output register word. The resulting binary signal derived by AND gate 330 activates flip-flop 326 to the set or reset state. Flip-flop 326 remains activated to the set or reset state until the command 5 has terminated, a which time the flip-flop is invariably reset as described supra.

The next four operations involved in a command 5 sequence are identical with the last four operations of command 3. In particular, if actual Y address indicating count in register 90 is less than the maximum Y address indicating number in input-output register 76, register 90 is incremented so that it stores the address $K+1$. Instruction counter 88 is then incremented to the address $K+3$ and the $Y+1$ address indicating contents of temporary storage register 90 are read into input-output register 76. Thereby, register 76 is loaded with the address of the memory location one greater than the address of the previously read out arbitrary subcommutated sequence word.

The next operation involves selecting the scratch pad memory address N stored in the three least significant bits of register 92, loading that address into address register 78 and activating input-output register 76 to the write status. Thereby, the address $Y+1$ now loaded into input-output register 76 is fed back into the scratch pad memory designated during the fetch operation.

The next operation involves reading the data at address $Y+1$, indicative of a switch number in array 50, into input-output register 76. To this end, a binary one signal is derived on each of leads S5, S16 and S17, whereby the $Y+1$ address stored in register 90 is fed to address register 76 through transfer circuit 82 while input-output register 76 is activated to the read state. Thereby, the data word stored at address $Y+1$, indicative of the number of the switch in array 50 to be activated, is loaded into input-output register 76 and the number of that switch is loaded formatter buffer register 50 at the completion of the command 5 sequence being considered.

If the comparison operation performed during command 5 indicates that the word stored in register 90 is equal to or greater than the word in register 76, the contents of instruction counter 88, memory address $K+2$, are read through transfer bus 82 to address register 78 while input-output register 76 is activated to the read state. Thereby, the word at memory location $K+2$, having a value in accordance with the lowest Y memory word in the arbitrary subcommutation sequence, is read into input-output register 76. Instruction counter 88 is then incremented so that it stores a count of $K+3$, whereby during the next fetch operation, data from the appropriate memory address is retrieved. The following operation involves loading address register 78 with the scratch pad address N originally designated and stored in the three least significant stages of register 92, while input-output register 76 is activated to the write status. In response to these conditions, the lowest Y memory address is loaded into the scratch pad memory location N assigned to the arbitrary subcommutation sequence.

The next operation is to read out the data at the lowest Y memory address stored in temporary storage register 90 by feeding the contents of register 90 through transfer circuit 82 into address register 78 while input-output register 76 is activated to the read state. This is the same final set of commands as was initiated for command 5 in response to the comparison matrix 112 indicating that the contents of register 90 were less than word stored in register 76. When the comparison matrix 112, however, indicates that the word stored in register 90 is equal to or greater than the word stored in register 76, the word in address register 78 designates the lowest Y memory location. With address register 78 storing the lowest Y memory address, input-output register 76 is loaded with the number of the gate in matrix 50 stored in the lowest Y memory address. The next time a word including a command 4 or 5 and designating scratch pad memory N is retrived from memory, input-output register 76 is loaded with the number of the gate in matrix 50 stored at the Y memory address one greater than the lowest Y address memory.

Consideration is now given to the operations performed and apparatus utilized in executing a command 6. A command 6, always at a memory address toward the end of a particular memory program, is utilized either to jump back to the next minor frame starting point of the same program which was just executed or to jump to the next minor frame starting point of a new program in response to the coded X bits which indicate the starting address of the four different programs which can be executed by the present system.

In response to the data word fetched from memory 36 containing a command 6, the fourth through sixth stages of buffer register 92 carry signals 110, respectively. In response to the output of buffer register 92, decoder 102 derives on lead 306 a binary one signal which is applied in parallel to OR gate 225, as well as to AND gates 237 and 238.

The first operation after the fetch sequence is enabling AND gate 237 in response to the C2 and B4 timing voltages. In response to a binary one signal derived from AND gate 237, a binary one signal is derived on lead S6 and is fed to each of OR gates 269 and 270. In response to the binary one signal on lead S6, transfer circuit 82 is activated so that the two X bits are fed through the two least significant stages of the transfer circuit and a binary one is derived from the fourth least significant stage thereof. Thereby, if the two X bits both have binary zero values, the transfer circuit 82 output signal is indicative of the count of eight; for the X bits having values of 01, 10 and 11, the transfer circuit outputs are counts of 9, 10 and 11, respectively. In response to the binary one signals on leads S16 and S17, as derived from OR gates 269 and 270, as well as AND gates 321 and 322, the signal derived on the output bus of transfer circuit 82 is fed to address register 78 and register 76 is loaded with the data word at one of the addresses 8–11. At addresses 8–11 are loaded the initial addresses for the four dfferent memory programs. If, therefore, the two X bits both have binary zero values, address register 78 is loaded with a binary signal indicative of memory location 8 and the data word at address 8, indicative of the starting address of the first program, is read to input-output register 76. Typically, the memory address for the first data word in the first program is at memory location 12.

In response to the trailing edge of the S6 signal, single shot multivibrator 360 is activated for a time period equal to the duration of the binary one signal derived by AND gate 237. In response to activation of multivibrator 360, a binary one signal is derived on lead $\overline{S6}$ and is fed through OR gate 132 to the clear input of instruction counter 88, whereby the instruction counter is loaded with all binary zeros.

The next command 6 operation is the derivation of binary one signals from AND gates 238 and 240 in response to the binary one signal levels on lead 306 and the B3 and C3 timing waveforms; in addition, AND gate 241 is activated in response to the short duration A4 timing pulse so that the output of gate 240 occurs between the leading and trailing edges of the output of gate 238. In response to the output of gate 238, binary one signals are fed to OR gates 261, 269 and 270, whereby binary one signals are derived on leads S1, S16 and S17 while the output of AND gate 240 causes a binary one signal to be derived on lead S11. In response to signal on lead S1, the starting address for the program now stored in input-output register 76, is fed in parallel to instruction counter 88 and address register 78 via transfer circuit 82, with both the counter and address register being respectively activated in response to the S16 and S11 leads carrying binary one signals. Thereby, instruction counter 88 is now loaded with the starting address of the program to be executed. Simultaneously, the signal on lead S17 activates input-output register 76 to the read state, whereby the data word indicative of the starting address for the program loaded in the address designated by the X bits is loaded into input-output register 76 in the time interval between the presently considered and following operations in the command 6 sequence.

The next operation in the command 6 sequence occurs in response to the derivation of a binary one signal by AND gate 239 in response to the output of OR gate 225 and the occurrence of the timing signals B2 and C4. The binary one signal derived by AND gate 239 is fed to the input of each of OR gates 261, 265 and 266, whereby each of leads S1, S7 and S13 is activated. In response to the binary one signals on leads S1 and S13, the word at the starting address loaded in input-output register 76 is fed to instruction register 96 while the binary one signal on lead S7 results in instruction counter 88 being incremented to an address one greater than the starting address. In response to these operations, the memory sequencer is in the same state as it is in prior to the initiation of each operating cycle. Since each of the operations associated with command 6 occurs between the fetch sequence and timing pulses necessary to initiate any of commands 0 through 5, the command indicated by the starting address is executed. In addition, counter 88 has been incremented so that when the next fetch operation begins, no repetition in the program sequence occurs.

From the foregoing it is seen that the command 6 is executed once during each minor frame and enables a new minor frame to be initiated. If the status of the X bits should change during a minor frame, a relatively infrequent occurrence, the minor frame of the new program is the minor frame immediately following the minor frame just read out from the previously analyzed program.

Consideration is now given to the operations involved in a command 7. It is the broad function of command 7 to synchronize the operation of memory sequencer 34 and formatter 38 with subsystem 20 which generates the primary timing signals utilized in the space satellite and the binary coded decimal timing code. To this end, once every second subsystem 20 generates a sync preset signal. If memory sequencer 34 and formatting timing unit 38 are in synchronism with the timing pulses derived by subsystem 20, the presence of a command 7 has no effect on the program being derived by memory sequencer 34. If, however, the system of the present invention is not in synchronism with the sync preset signal generated by subsystem 20, readout of a memory word containing a command 7 terminates the further readout of data from the memory until the next sync preset pulse is derived by subsystem 20 and synchronism between sequencer 34 and subsystem 20 is reestablished.

Synchronism between the memory sequencer 34 and the one pulse per second signal derived by subsystem 20 is checked once per major frame in response to minor frame scratch pad counter 0 having a count of zero loaded therein simultaneously with the derivation of a command 7 from the interrogated memory address K. It is to be recalled from the description of command 3 that during the minor frame while scratch pad counter 0 has a count of zero therein, flip-flop 348 is activated to the set state, whereby the flip-flop Q output is set to a binary one level. The binary one Q output of flip-flop 348 is fed to AND gate 362 which is also responsive to the B2 and C3 timing voltages and the signal on lead 307. The signal on lead 307 has a binary one level only in response to the word fetched from memory 36 having the fourth through sixth bits thereof having the binary levels 111, respectively. AND gate 362 derives a binary one signal in response to the signals derived from the Q output of flip-flop 384 and a binary one signal on lead 307 to reset flip-flop 364 so that binary one signal is derived from the $\overline{Q}$ output thereof. Flip-flop 364 is maintained in the reset condition until the one pulse per second sync preset signal is derived by subsystem 20 and fed to the flip-flop set input. Flip-flop 364 is activated to the reset state once every major frame immediately after the execution of the fetch operation and the data word at the address in memory immediately following the command 7 has been loaded in input-output register 76.

Reading the data at address $K+1$, immediately following the command 7, is performed regardless of the state of flip-flop 364 in response to AND gate 236 being responsive to the signal on lead 307 and the C2, B4 timing waveforms. The binary one signal derived from AND gate 236 is fed through gates 262, 269 and 270, whereby binary one signals are derived on the S2, S16 and S17 output leads. In response to the signal on lead S2, transfer circuit 82 is activated so that the $K+1$ count stored in instruction counter 88, is fed to address register 78 which is enabled by the S16 lead carrying a binary one level. Simultaneously, input-output register 76 is activated in response to the signal on lead S17 to a read state, whereby the data word at the $K+1$ memory location is read into input-output register 76.

After register 76 has been loaded with the data word at memory location $K+1$, the B2, C3 timing waveforms are derived so that flip-flop 364 is activated to the reset state in response to the output of AND gate 362. Activation of flip-flop 364 has no effect on the remainder of the system at the present time so that the sequencer continues to function to read out the data word at $K+1$ address stored in register 76 and to feed the data word at address $K+1$ to instruction register 96. Simultaneously with feeding the data word at address $K+1$ to register 96, instruction counter 88 is incremented to the address two in excess of the address storing the command 7, $K+2$, so that when the next 2.5 ms. sequence is initiated no repetition of readout of the memory words oocurs.

To perform these operations, AND gate 239 is enabled in response to the output of OR gate 225 and the B2, C4 timing waveforms. The resulting binary one output of AND gate 239 is fed to each of OR gates 261, 265 and 266, whereby binary one signals are derived on leads S1, S7 and S13. The signals on leads S1 and S13 enable the data word at address $K+1$, as stored in input-output register 76, to be fed through transfer circuit 82 to instruction register 96 to enable the instruction at address $K+1$ to be performed. Simultaneously, instruction counter 88 is incremented in response to the S7 lead carrying a binary one signal. Memory sequencer 34 now responds to the word at address $K+1$ to perform the command at address $K+1$.

If formatter 34 and subsystem 20 are in synchronism, the subsystem derives the sync preset pulse immediately after completion of the sequence of operations associated with the memory location $K+1$. To this end, flip-flop 364 is activated to the set state immediately prior to the next fetch operation and the sequencer continues to function in response to the word at address $K+2$. If, however, there is a lack of synchronization between formatter 34 and subsystem 20, flip-flop 364 remains activated to the reset state, whereby a binary one signal is supplied by the flip-flop $\overline{Q}$ output to each of OR gates 227, 228 and 229. In response to each of OR gates 227–229 being fed with a binary one from the $\overline{Q}$ output of flip-flop 364, each of gates 232, 233 and 234 is inhibited and the further operation of decoder 102 is prevented. In particular, the operation of gates 232 and 233 is inhibited in response to the derivation of a binary one signal by OR gate 229; gate 234 is inhibited in response to the output of OR gate 228; and the output of decoder 102 is blocked in response to the output of OR gate 227. In response to gates 232–234 and decoder 102 being inhibited, none of the fetch sequence operations can be executed and the operation of sequencer 34 ceases. Once the operation of sequencer 34 ceases, no further data can be fed to formatter 38 and the system is in a stall or halt operating mode.

System operation commences as soon as the sync preset signal is derived by subsytem 20, whereby flip-flop 364 is activated to the set state and the flip-flop $\overline{Q}$ output is a binary zero, enabling the further derivation of timing pusles from gates 232–234 and the feeding of data from decoder 102.

As each major frame is initiated, certain of the digital data sources 44 and 46 must be shifted so that the data source states are synchronized with the beginning of the major frame. To develop a pulse simultaneously with the beginning of each major frame, the Q output of flip-flop 364 is combined with the trailing edge of the sync preset pulse fed to the set input of the flip-flop. To this end, there is provided AND gate 366 that includes a pair of inputs, one responsive to the Q output of flip-flop 364 and a second responsive to the trailing edge of the sync preset signal. Since flip-flop 364 is activated to the set state in response to the leading edge of the sync preset signal and remains in the set state until a major frame has been completed, AND gate 366 derives a binary one output in time coincidence with the initiation of each major frame. The output of AND gate 366 is fed to the digital sources 44 and 46 requiring synchronization with the generation of major frames by sequencer 34 and formatting unit 38.

Each of the commands and operations involved in the eight different instructions has now been described. It will be recalled that certain signals from the reprogrammer are fed into timing and control logic circuit 84. A description of the connections within circuit 84 to the leads carrying these signals will now be given. During reprogramming it is desired to substantially terminate the operation of the memory sequencer 34, an operation performed by feeding the P18 signal through OR gates 227–229, whereby the same result as is achieved in response to flip-flop 364 being activated to the reset state is attained.

In the memory verify mode of operation, only the contents of memory 36 are read and the other operations of sequencer 34 are inhibited. To this end, the P17 signal derived from the reprogrammer is fed to OR gates 227 and 228. In response to the resulting binary one output of OR gate 227, decoder 102 is inhibited so that none of the commands in the memory words can be executed. In response to the binary one output of OR gate 228, no binary one signals can be derived by gate 234 in response to the D2, C2 and B1 timing pulses. Thereby, the last operation involved in a fetch sequence, feeding the contents of input-output register 76 to instruction register 96 is prevented, to further obviate the possibility of executing any of the commands in the memory words. In order to read the memory words directly through formatter 38 and prevent the switch in array 50 from being activated, the P17 binary one level derived during the verify operation is fed through OR gate 311.

During certain specified times during the reprogramming operation, signals P11 and P12 have binary one levels, as described supra. A binary one P12 signal is converted into a similar signal on leads S2 and S16 by virtue of the connection of the lead carrying the P12 signal to the inputs of OR gates 262 and 269. The occurrence of a binary one P11 signal is detected by feeding that signal to the input of OR gates 265 and 268, whereby binary one signals are derived from leads S7 and S15.

Consideration will now be given to a sample memory program compiled in accordance with the present invention and specified in Table 2.

TABLE 2

| Memory Location Number | Conts. of Memory Loc. — Bit Number 10 | 9 | 8 | 7 | 6 | 5 | 4 | 3 | 2 | 1 | Com. No. | "N" Count. | Input [1] | Minor Frame Word No. |
|---|---|---|---|---|---|---|---|---|---|---|---|---|---|---|
| 0 | Contents of "$N_0$" | | | | | | | | | | | | | |
| 1 | Contents of "$N_1$" | | | | | | | | | | | | | |
| 2 | Contents of "$N_2$" | | | | | | | | | | | | | |
| 3 | Contents of "$N_3$" | | | | | | | | | | | | | |
| 4 | Contents of "$N_4$" | | | | | | | | | | | | | |
| 5 | Contents of "$N_5$" | | | | | | | | | | | | | |
| 6 | Contents of "$N_6$" | | | | | | | | | | | | | |
| 7 | Contents of "$N_7$" | | | | | | | | | | | | | |
| 8 | 0 | 0 | 0 | 0 | 0 | 0 | 1 | 1 | 0 | 0 | | | | |
| 9 | Start Add. of Prog. 2 | | | | | | | | | | | | | |
| 10 | Start Add. of Prog. 3 | | | | | | | | | | | | | |
| 11 | Start Add. of Prog. 4 | | | | | | | | | | | | | |
| 12 | 0 | 0 | 0 | 0 | 0 | 0 | 0 | 0 | 1 | 1 | 0 | | $A_3$ | 80 |
| 13 | 1 | 1 | 1 | 1 | 1 | 1 | 1 | | | | 7 | | | |
| 14 | 1 | 1 | 1 | 1 | 0 | 0 | 1 | | | | 1 | | | 1 |
| 15 | SYNC | | | | | | | | | | | | | |
| 16 | 1 | 1 | 1 | 1 | 0 | 0 | 1 | | | | 1 | | | 2 |
| 17 | SYNC | | | | | | | | | | | | | |
| 18 | 0 | 0 | 0 | 0 | 0 | 0 | 0 | 0 | 0 | 1 | 0 | | $A_1$ | 3 |
| 19 | 0 | 0 | 0 | 0 | 0 | 0 | 0 | 0 | 1 | 0 | 0 | | $A_2$ | 4 |
| 20 | 0 | 0 | 0 | 0 | 0 | 0 | 0 | 0 | 1 | 1 | 0 | | $A_3$ | 5 |
| 21 | 1 | 1 | 1 | 1 | 0 | 1 | 1 | 0 | 0 | 0 | 3 | 0 | | 6 |
| 22 | | | 0 | 1 | 0 | 0 | 1 | 1 | 1 | 1 | | | | |
| 23 | | | 0 | 0 | 0 | 0 | 0 | 0 | 0 | 0 | | | | |
| 24 | 0 | 0 | 0 | 0 | 0 | 0 | 0 | 1 | 0 | 0 | 0 | | D | 7 |
| 25 | 0 | 0 | 0 | 0 | 0 | 0 | 0 | 0 | 0 | 1 | 0 | | $A_1$ | 8 |
| 26 | 0 | 0 | 0 | 0 | 0 | 0 | 0 | 0 | 1 | 0 | 0 | | $A_2$ | 9 |
| 27 | 0 | 0 | 0 | 0 | 0 | 0 | 0 | 0 | 1 | 1 | 0 | | $A_3$ | 10 |
| 28 | 0 | 0 | 0 | 0 | 0 | 0 | 0 | 1 | 0 | 1 | 0 | | C | 11 |
| 29 | 0 | 0 | 0 | 0 | 1 | 1 | 0 | 0 | 0 | 0 | 0 | | $B_1$ | 12 |
| 30 | 0 | 0 | 0 | 0 | 0 | 0 | 0 | 0 | 0 | 1 | 0 | | $A_1$ | 13 |
| 31 | 0 | 0 | 0 | 0 | 0 | 0 | 0 | 0 | 1 | 0 | 0 | | $A_2$ | 14 |
| 32 | 0 | 0 | 0 | 0 | 0 | 0 | 0 | 0 | 1 | 1 | 0 | | $A_3$ | 15 |
| 33 | 1 | 1 | 1 | 1 | 0 | 1 | 1 | 0 | 0 | 1 | 3 | 1 | $H_b$ | 16 |
| 34 | 0 | 0 | 0 | 0 | 1 | 0 | 1 | 1 | 1 | 0 | | | | |
| 35 | 0 | 0 | 0 | 0 | 1 | 0 | 0 | 0 | 0 | 0 | | | | |
| 36 | 0 | 1 | 1 | 1 | 1 | 1 | 0 | 1 | 0 | 0 | 0 | | F | 17 |
| 37 | 0 | 0 | 0 | 0 | 0 | 0 | 0 | 0 | 0 | 1 | 0 | | $A_1$ | 18 |
| 38 | 0 | 0 | 0 | 0 | 0 | 0 | 0 | 0 | 1 | 0 | 0 | | $A_2$ | 19 |
| 39 | 0 | 0 | 0 | 0 | 0 | 0 | 0 | 0 | 1 | 1 | 0 | | $A_3$ | 20 |

TABLE 2.—Continued

| Memory Location Number | Conts. of Memory Loc. — Bit Number 10 | 9 | 8 | 7 | 6 | 5 | 4 | 3 | 2 | 1 | Com. No. | "N" Count. | Input [1] | Minor Frame Word No. |
|---|---|---|---|---|---|---|---|---|---|---|---|---|---|---|
| 40 | 1 | 1 | 1 | 1 | 0 | 1 | 0 | 0 | 0 | 1 | 2 | 1 | $H_b$ | 21 |
| 41 | 0 | 0 | 0 | 0 | 0 | 0 | 0 | 1 | 0 | 1 | 0 | ---- | C | 22 |
| 42 | 0 | 0 | 0 | 0 | 0 | 0 | 0 | 0 | 0 | 1 | 0 | ---- | $A_1$ | 23 |
| 43 | 0 | 0 | 0 | 0 | 0 | 0 | 0 | 0 | 1 | 0 | 0 | ---- | $A_2$ | 24 |
| 44 | 0 | 0 | 0 | 0 | 0 | 0 | 0 | 0 | 1 | 1 | 0 | ---- | $A_3$ | 25 |
| 45 | 1 | 1 | 1 | 1 | 0 | 1 | 1 | 1 | 0 | 0 | 3 | 4 | $H_L$ | 26 |
| 46 | 0 | 1 | 1 | 1 | 0 | 0 | 0 | 0 | 1 | 0 | ---- | ---- | ---- | ---- |
| 47 | 0 | 0 | 1 | 0 | 0 | 0 | 0 | 0 | 1 | 1 | ---- | ---- | ---- | ---- |
| 48 | 1 | 1 | 1 | 1 | 1 | 1 | 1 | 0 | 0 | 1 | 2 | 1 | $H_b$ | 27 |
| 49 | 0 | 0 | 0 | 0 | 0 | 0 | 0 | 0 | 0 | 1 | 0 | ---- | $A_1$ | 28 |
| 50 | 0 | 0 | 0 | 0 | 0 | 0 | 0 | 0 | 1 | 0 | 0 | ---- | $A_2$ | 29 |
| 51 | 0 | 0 | 0 | 0 | 0 | 0 | 0 | 0 | 1 | 1 | 0 | ---- | $A_3$ | 30 |
| 52 | 1 | 1 | 1 | 1 | 0 | 1 | 1 | 0 | 1 | 0 | 3 | 2 | $H_b$ | 31 |
| 53 | 0 | 0 | 0 | 1 | 1 | 1 | 1 | 0 | 0 | 0 | ---- | ---- | ---- | ---- |
| 54 | 0 | 0 | 0 | 1 | 1 | 0 | 0 | 1 | 0 | 1 | ---- | ---- | ---- | ---- |
| 55 | 0 | 0 | 0 | 0 | 1 | 0 | 1 | 1 | 1 | 0 | 0 | ---- | $B_1$ | 32 |
| 56 | 0 | 0 | 0 | 0 | 0 | 0 | 0 | 0 | 0 | 1 | 0 | ---- | $A_1$ | 33 |
| 57 | 0 | 0 | 0 | 0 | 0 | 0 | 0 | 0 | 1 | 0 | 0 | ---- | $A_2$ | 34 |
| 58 | 0 | 0 | 0 | 0 | 0 | 0 | 0 | 0 | 1 | 1 | 0 | ---- | $A_3$ | 35 |
| 59 | 1 | 1 | 1 | 1 | 0 | 1 | 0 | 1 | 0 | 0 | 2 | 4 | $H_L$ | 36 |
| 60 | 0 | 0 | 0 | 0 | 1 | 0 | 1 | 1 | 1 | 1 | 0 | ---- | $B_2$ | 37 |
| 61 | 0 | 0 | 0 | 0 | 0 | 0 | 0 | 0 | 0 | 1 | 0 | ---- | $A_1$ | 38 |
| 62 | 0 | 0 | 0 | 0 | 0 | 0 | 0 | 0 | 1 | 0 | 0 | ---- | $A_2$ | 39 |
| 63 | 0 | 0 | 0 | 0 | 0 | 0 | 0 | 0 | 1 | 1 | 0 | ---- | $A_3$ | 40 |
| 64 | 1 | 1 | 1 | 1 | 0 | 1 | 0 | 0 | 1 | 0 | 2 | 2 | $H_h$ | 41 |
| 65 | 0 | 0 | 0 | 0 | 0 | 0 | 0 | 1 | 0 | 1 | 0 | ---- | C | 42 |
| 66 | 0 | 0 | 0 | 0 | 0 | 0 | 0 | 0 | 0 | 1 | 0 | ---- | $A_1$ | 43 |
| 67 | 0 | 0 | 0 | 0 | 0 | 0 | 0 | 0 | 1 | 0 | 0 | ---- | $A_2$ | 44 |
| 68 | 0 | 0 | 0 | 0 | 0 | 0 | 0 | 0 | 1 | 1 | 0 | ---- | $A_3$ | 45 |
| 69 | 1 | 1 | 1 | 1 | 0 | 1 | 0 | 1 | 0 | 0 | 2 | 4 | $H_L$ | 46 |
| 70 | 0 | 0 | 0 | 0 | 0 | 0 | 0 | 1 | 0 | 0 | 0 | ---- | D | 47 |
| 71 | 0 | 0 | 0 | 0 | 0 | 0 | 0 | 0 | 0 | 1 | 0 | ---- | $A_1$ | 48 |
| 72 | 0 | 0 | 0 | 0 | 0 | 0 | 0 | 0 | 1 | 0 | 0 | ---- | $A_2$ | 49 |
| 73 | 0 | 0 | 0 | 0 | 0 | 0 | 0 | 0 | 1 | 1 | 0 | ---- | $A_3$ | 50 |
| 74 | 1 | 1 | 1 | 1 | 0 | 1 | 0 | 0 | 1 | 0 | 2 | 2 | $H_b$ | 51 |
| 75 | 0 | 0 | 0 | 0 | 1 | 1 | 0 | 0 | 0 | 0 | 0 | ---- | $B_1$ | 52 |
| 76 | 0 | 0 | 0 | 0 | 0 | 0 | 0 | 0 | 0 | 1 | 0 | ---- | $A_1$ | 53 |
| 77 | 0 | 0 | 0 | 0 | 0 | 0 | 0 | 0 | 1 | 0 | 0 | ---- | $A_2$ | 52 |
| 78 | 0 | 0 | 0 | 0 | 0 | 0 | 0 | 0 | 1 | 1 | 0 | ---- | $A_3$ | 55 |
| 79 | 1 | 1 | 1 | 1 | 0 | 1 | 0 | 0 | 1 | 0 | 2 | 2 | $H_h$ | 56 |
| 80 | 0 | 0 | 0 | 0 | 0 | 0 | 1 | 0 | 1 | 0 | 0 | ---- | G | 57 |
| 81 | 0 | 0 | 0 | 0 | 0 | 0 | 0 | 0 | 0 | 1 | 0 | ---- | $A_1$ | 58 |
| 82 | 0 | 0 | 0 | 0 | 0 | 0 | 0 | 0 | 1 | 0 | 0 | ---- | $A_2$ | 59 |
| 83 | 0 | 0 | 0 | 0 | 0 | 0 | 0 | 0 | 1 | 1 | 0 | ---- | $A_3$ | 60 |
| 84 | 1 | 1 | 1 | 1 | 1 | 0 | 1 | 0 | 1 | 1 | 5 | 3 | $H_b$ | 61 |
| 85 | 0 | 0 | 0 | 1 | 1 | 1 | 0 | 0 | 0 | 1 | ---- | ---- | ---- | ---- |
| 86 | 0 | 0 | 0 | 1 | 1 | 0 | 1 | 1 | 0 | 1 | ---- | ---- | ---- | ---- |
| 87 | 0 | 0 | 0 | 0 | 0 | 0 | 0 | 1 | 0 | 1 | 0 | ---- | C | 62 |
| 88 | 0 | 0 | 0 | 0 | 0 | 0 | 0 | 0 | 0 | 1 | 0 | ---- | $A_1$ | 63 |
| 89 | 0 | 0 | 0 | 0 | 0 | 0 | 0 | 0 | 1 | 0 | 0 | ---- | $A_2$ | 64 |
| 90 | 0 | 0 | 0 | 0 | 0 | 0 | 0 | 0 | 1 | 1 | 0 | ---- | $A_3$ | 65 |
| 91 | 1 | 1 | 1 | 1 | 0 | 1 | 0 | 1 | 0 | 0 | 2 | 4 | $H_L$ | 66 |
| 92 | 0 | 0 | 0 | 1 | 0 | 0 | 0 | 0 | 0 | 0 | 0 | ---- | E | 67 |
| 93 | 0 | 0 | 0 | 0 | 0 | 0 | 0 | 0 | 0 | 1 | 0 | ---- | $A_1$ | 68 |
| 94 | 0 | 0 | 0 | 0 | 0 | 0 | 0 | 0 | 1 | 0 | 0 | ---- | $A_2$ | 69 |
| 95 | 0 | 0 | 0 | 0 | 0 | 0 | 0 | 0 | 1 | 1 | 0 | ---- | $A_3$ | 70 |
| 96 | 0 | 0 | 0 | 0 | 1 | 1 | 0 | 1 | 1 | 1 | 0 | ---- | J | 71 |
| 97 | 0 | 0 | 0 | 0 | 1 | 1 | 0 | 0 | 0 | 0 | 0 | ---- | $B_1$ | 72 |
| 98 | 0 | 0 | 0 | 0 | 0 | 0 | 0 | 0 | 0 | 1 | 0 | ---- | $A_1$ | 73 |
| 99 | 0 | 0 | 0 | 0 | 0 | 0 | 0 | 0 | 1 | 0 | 0 | ---- | $A_2$ | 74 |
| 100 | 0 | 0 | 0 | 0 | 0 | 0 | 0 | 0 | 1 | 1 | 0 | ---- | $A_3$ | 75 |
| 101 | 1 | 1 | 1 | 1 | 0 | 1 | 1 | 1 | 0 | 1 | 3 | 5 | $H_L$ | 76 |
| 102 | 1 | 0 | 0 | 1 | 0 | 0 | 0 | 1 | 1 | 0 | ---- | ---- | ---- | ---- |
| 103 | 0 | 1 | 1 | 1 | 1 | 1 | 0 | 1 | 1 | 1 | ---- | ---- | ---- | ---- |
| 104 | 0 | 0 | 0 | 0 | 0 | 0 | 0 | 0 | 0 | 0 | 0 | ---- | MT | 77 |
| 105 | 0 | 0 | 0 | 0 | 0 | 0 | 0 | 0 | 0 | 1 | 0 | ---- | $A_1$ | 78 |
| 106 | 0 | 0 | 0 | 0 | 0 | 0 | 0 | 0 | 1 | 0 | 0 | ---- | $A_2$ | 79 |
| 107 | 1 | 1 | 1 | 1 | 1 | 1 | 0 | ---- | ---- | ---- | 6 | ---- | ---- | ---- |
| 108 | 0 | 0 | 0 | 0 | 0 | 0 | 1 | 1 | 1 | 1 | ---- | ---- | ---- | ---- |
| 109 | 1 | 0 | 0 | 1 | 0 | 0 | 1 | 1 | 1 | 1 | ---- | ---- | ---- | ---- |
| 110 | 1 | 0 | 0 | 1 | 1 | 1 | 1 | 1 | 1 | 1 | ---- | ---- | ---- | ---- |
| 111 | 0 | 0 | 0 | 0 | 0 | 0 | 1 | 0 | 0 | 1 | ---- | ---- | ---- | ---- |
| 112 | 0 | 0 | 0 | 1 | 0 | 1 | 0 | 0 | 0 | 1 | ---- | ---- | ---- | ---- |

[1] See table below.

| Code | Function | Samples per second |
|---|---|---|
| $A_1$ | Cloudtop Spectrometer | 80 |
| $A_2$ | do | 80 |
| $A_3$ | do | 80 |
| $B_1$ | Filter Wedge Spectrometer | 20 |
| $B_2$ | do | 5 |
| C | Visible Spectrometer | 20 |
| D | Infrared Spectrometer | 10 |
| E | Selective Chopper Radiometer | 5 |
| F | Backscatter U.V. | 5 |
| G | Sferics | 5 |
| $H_L$ | Housekeeping | 1/16 |
| $H_h$ | do | 1 |
| MT | B.C.D. Time Code | 5 |
| J | Ultraviolet Spectrometer | 5 |

The legend associated with Table 2 indicates the gate numbers in matrix 50 which are activated to sample particular ones of data sources 44, 46 and 48. The code designations for the data sources are indicated by the letters in the first column, while the function of each of the coded data sources is indicated in the second column. The third column specifies the rate at which the various data sources are sampled, assuming that each minor frame includes 80 words each having a duration of 2.5 ms. and that each major frame includes 80 minor frames, whereby each of the minor and major frames subsists for periods of 0.2 and 16 seconds, respectively.

Consideration will be given to the manner by which the memory sequencer responds to the sample program of Table 2, by assuming that scratch pad memory 0 is storing a count of 79, indicative of the last minor frame in a major frame. In addition, it is assumed that a command 6 has just been completely executed and that the X bits had the values 00, whereby instruction counter 88 has a count of 12 loaded therein.

In response to the stated conditions, the data word at memory address 12 is fed to instruction register 96. Since bits 7–10 in the word read from memory location 12 all have binary zero levels, NAND gate 100, FIG. 4, derives a binary one output to activate register stage 98 to the one state. In response to the binary one signal derived by register stage 98, OR gate 227, FIG. 5, derives a binary one signal to inhibit the output of decoder 102, whereby timing and control logic circuit 84 is rendered unresponsive to the fourth through sixth bits containing commands 1 through 7. Since decoder 102 is inhibited, OR gate 311 derives a binary zero output, assuming normal operation, wherein the gate/value signal is zero. While the binary zero is derived from OR gate 311, a binary one signal is derived on lead S1 and the contents of memory address 12 stored in input-output register 76 are fed through transfer circuit 82 while the input to buffer register 40 is enabled. Thereby, the ten least significant stages of register 40 are loaded with the data word at address 12 while the most significant bit stage of the buffer register is loaded with a binary zero, gate indicating signal in response to the output of OR gate 311.

During the next 2.5 ms. interval, the signal in the ten least significant stages of register 40, indicative of gate number 3 in matrix 50, is read out, whereby cloudtop spectrometer analog source 48 numbered A3 is read through gate number 3 of matrix 50.

The analog sources 48 are numbered so that a binary one signal is derived by matrix 42 on lead 66 while gate number 3 is enabled, simultaneously with the derivation of a binary zero output from the most significant bit stage of register 40. Switch 56 responds to the signal on lead 66, as coupled through decoder 64 and the gate indicating signal derived from register 40, to enable the ten bit parallel word derived from analog-to-digital converter 52, indicative of the value of the signal source A3, to be fed to parallel-to-serial converter 58.

While the word at memory location number 12 is being fed through formatter 38 to register 58, the next fetch operation is commenced from memory location 13. The data word at memory location 13 is fetched since instruction counter 88 was incremented by a count of one during the previous fetch operation, immediately after data word 12 was read into input-output register 76.

In response to the word at memory address 13 being fed to instruction register 96, buffer stage 98 derives a binary zero level, whereby the operation of decoder 102 is not inhibited. Decoder 102 responds to the binary one bits in each of bit positions 4–6 to activate lead 307 in timing and control logic circuit 84. In response to the binary one signal on lead 307, a command 7 is initiated and instruction counter 88 is incremented to memory location 14. The data word at memory location 14, commanding readout of the memory word at address 15, a minor frame sync word, is now read into instruction register 96 and the sync word at memory location 15 is fed to register 40 in formatter 38. After the sync word at memory location 15 has been read into formatter 38, the program completes execution of the command associated with memory address 13. Since scratch pad counter 0, storing a count indicative of the minor frame number within the major frame, still stores a value of 79, the sequencer operation continues and the word at memory location 15 is read out. The manner by which the command 7 functions to synchronize the system operation in conjunction with a sync preset pulse is described infra in conjunction with memory location 13 in the minor frame immediately following the presently considered minor frame.

In response to flip-flop 364 being set by the sync preset signal, the sync word at memory address 15, as stored in input-output register 76, is fed to formatter 38. Simultaneously, the binary one signal on lead 301 is fed through OR gate 311 to the most significant bit stage of buffer register 40. Thereby, in response to readout of buffer register 40, switch 56 is activated so that the word stored in the ten least significant bit stages of buffer register 40 are fed directly through the switch to shift register 58.

After the sync word at memory address 15 has been read out from register 76, the count 16 in instruction counter 88 enables the word at memory address 16 to be fed to input-outer register 76. Since the word at memory location 16 is another command 1, no further consideration will be given to the manner by which it is processed to gate the sync word at memory location 17 to formatter 38. The following three words in memory locations 18, 19 and 20 have command zeros and are processed as indicated with regard to the word at memory location 12 to respectively activate gates 1, 2 and 3 in matrix 50, whereby the analog signals derived by cloudtop spectrometers A1, A2 and A3 are fed to analog-to-digital converter 52.

After the data word at memory location 20 has been read from input-output register 76, instruction counter 88 is activated so that it stores a count commensurate with memory address 21. Memory address 21 specifies a command 3 and indicates that minor frame number indicating scratch pad counter 0 is to be activated. The words at memory addresses 22 and 23 indicate the maximum and minimum values for the sequential subcommutated sequence specified by command 3. For command 3 indicating scratch pad counter 0, the data at memory addresses 22 and 23 have values of 79 and 0, respectively, to indicate the maximum number of minor frames in a major frame and the zero count of the initial minor frame.

Under the assumed conditions, minor frame counting scratch pad memory location 0 stores a count of 79, designating the last minor frame in a major frame and equal to the count at memory location 22. During the command 3 operation, the minor frame count in scratch pad memory 0 is compared with the data at memory address 22 and an indication is derived signaling that the scratch pad memory count is at least equal to the maximum count. In response to the comparison operation, the word at memory location 23 is fed into input-output register 76 and is fed to scratch pad counter 0. Thereby, during the next fetch operation, the 00000000 signal stored in input-output register 76 is fed to formatter 38. Simultaneously, the two X bits, indicative of the number of the program, are fed through transfer circuit 82 to the ninth and tenth stages of buffer register 40. Thereby, the buffer register stores a signal indicative of the initial minor frame in a major frame and the number of the program being executed.

While the 00000000 is being fed through transfer circuit 82 to formatter 38, it is also applied to the input of NAND gate 340, FIG. 5, to activate flip-flop 348 to the set state. Activation of flip-flop 348 to the set state results in flip-flop 326 being set until the next command 3 signal signifying the 0 scratch pad memory is derived. Since the command 3 designating scratch pad counter 0 is not derived until the next minor frame, flip-flop 326 remains in the set state throughout the initial minor frame in each major frame.

During the command 3, instruction counter 88 was advanced to store a count indicative of memory location 24. The data word at memory location 24 contains a command 0, signifying that an analog infrared spectrometer signal source is to be sampled through gate 4 in matrix 50. Upon completion of the command indicated by memory location 24, memory addresses 25–32 are read out in sequence, since each includes a command 0 for sampling various analog signal sources by means of matrix 50.

In response to instruction counter 88 being advanced to memory address 33, a command 3 is again reached, specifying the utilization of scratch pad counter 1, at memory location 1. The data at memory addresses 33–35 indicate that a sequential subcommutated sequence for activating gates numbered 32 through 46 in matrix 50 is to be generated in conjunction with scratch pad counter 1. Since the initial minor frame is being processed, flip-flop 326 is activated to the set state and the command 3 sequence is the same as if the word stored in scratch pad counter 1 were equal to or greater than the upper limit signal stored at memory location 34. In response to the set state of flip-flop 326, thereby, the starting value, at memory location 35, for the sequential subcommutated sequence is fed to scratch pad counter 1 and through transfer circuit 82 to buffer register 40 in formatter 38. The gate/value signal derived by OR gate 311 has a binary zero level, whereby the lowest numbered gate in the sequential subcommutated sequence, gate number 32 in matrix 50, is activated to be responsive to a signal source.

In addition to the different processing required in memory sequencer 34 for the gate indicating words retrieved from counter 1, formatter 38 responds to the words read from scratch pad counter 1 in a manner different from many of the words having a command 0. In particular, the word stored in scratch pad counter 1 controls activation of switches in matrix 50 associated with digital sources 44 or 46. To this end, the words read from scratch pad counter 1 have values such that decoding matrix 42 responds to them to derive a binary zero output on lead 66. The binary zero signal on lead 66 is detected by decoder 64 to activate switch 56 so that it is responsive to the output of serial-to-parallel converter 60, rather than the signal derived by analog-to-digital converter 52.

During the operations performed in response to the word at memory location 33, instruction counter 88 is advanced to a count of 36. In response to the word at memory address 36, a command 0 cycle is initiated to enable gates in matrix 50 in the manner indicated supra. Thereafter, the 0 commands at memory locations 37–39 are read out and executed in sequence.

After the command 0 indicated at memory locations 39 has been performed, instruction counter 88 is activated so that it stores a signal commensurate with memory address 40. At memory address 40, a command 2 is stored, designating the use of scratch pad counter 1, the same scratch pad counter which is designated by memory location 33. When memory address 40 is reached, scratch pad counter 1 is loaded with a signal indicating that gate 33 in matrix 50 is to be enabled. In response to the command 2 at memory location 40, the signal in scratch pad counter 1 is read into input-output register 76 and from there it is fed to buffer register 40 in formatter 38.

After the command 2 operation at memory location 40 has been completed, instruction counter 88 is storing a signal commensurate with memory location 41. The word at memory location 41 includes a command 0, as does each of the words at memory addresses 42–44. The words at addresses 41–44 are read in sequence, whereby the signal sources connected to the designated gates in matrix 50 are sequentially fed through switch 56 to shift register 58.

After the memory sequencer 34 operation with regard to address 44 has terminated, memory address 45 is analyzed. Memory address 45 includes a command 3 and designates scratch pad memory 4. In response to the word at memory address 45, scratch pad counter 4 is activated in the same manner as indicated supra with regard to activation of scratch pad counter 1 by the word at memory location 33. Thereby, as the command 3 instruction is being completed, scratch pad counter 4 is loaded with a word having a value indicative of gate 131 and a signal designating activation of the same gate is fed to formatter 38.

In the manner indicated, the sequence continues so that the different gates in matrix 50 are activated in response to the command 0 signals and the command 2 signals specifying the scratch pad counters. Further, scratch pad counter 2 is enabled in response to the command 3 at memory location 52. The operation continues until instruction counter 88 has advanced to memory location 84.

At memory address 84, the word includes a command 5 for generating arbitrary subcommutated sequences. In addition, the word at memory address 84 specifies that scratch pad counter 3, at memory address 3, is to be utilized in conjunction with the arbitrary subcommutated sequence. At memory addresses 85 and 86 are stored data words indicative of the upper and lower limits for the count in scratch pad counter 3, which limits are respectively 112 and 108. The data words at memory locations 84–86 are utilized in conjunction with scratch pad counter 3 and the gate indicating words at memory locations 108–112 to specify which of the gates in matrix 50 are to be activated in the arbitrary subcommutated sequence. In particular, the words at addresses 108–112 respectively indicate that gate numbers 15, 591, 639, 9 and 81 in matrix 50 are to be activated during an arbitrary subcommutated sequence.

During the initial minor frame, it is to be recalled flip-flop 326 is activated to the set state, whereby memory sequencer 34 functions as if scratch pad counter 3 stored a signal equal to or greater than the limit address 113 at memory location 85. Under these conditions, the command 5 operation causes the data word at memory address 108, specifying the closing of gate 15 in matrix 50, to be read out to formatter 38 during the frame being considered. In addition, the command 5 activates sequencer 34 so that memory location 108 is stored in the scratch pad counter 3 upon completion of the command 5 operation and instruction counter 88 is incremented to the memory location 87.

Between memory locations 87 and 103, the system functions in the manner described to read out commands 0, 2 and 3 is minor frame word numbers 62–76.

At memory location 104, a command 0 is generated and processed by memory sequences 34 in exactly the same manner as all other command zeros. The command 0 at memory location 104, however, activates formatter 38 in a manner slightly different from that described in conjunction with the remaining command zeros. In particular, the command 0 at address 104 activates decoding matrix 42 so that a binary one signal is derived on output lead 68 thereof. The binary one signal on lead 68 is detected by decoder 64 which activates switch 56 to enable the time indicating binary coded decimal signals stored in register 62 to be fed to parallel-to-serial converter 58.

The system processes the words at memory locations 105 and 106 in the manner indicated for typical command 0 words. Upon completion of the instruction at memory address 106, command 6, indicative of a jump operation, at memory location 107 is reached. In response to the command 6 at memory address 107, the two X bits are examined. In the present instance, the two X bits direct the system to memory location 8, where the starting address 12 for the sample program is stored. If the X bits had other values, between 1 and 3, the jump operation would have been to memory locations 9–11, respectively, which store the starting addresses of programs 2, 3 and 4. The words in programs 2–4 are loaded at memory addresses greater than the memory addresses for the presently considered program 1. Hence, instruction counter 88 is now loaded with a count indicative of the starting address of the program commanded by the two X bits; for program 1 memory location 12.

One complete minor frame operation has now been described. During the minor frame, many of the gates in array 50 were enabled at least once. Others of the gates in matrix 50 were not enabled during the first minor frame, these gates being some of those associated with the sequential and arbitrary subcommutated sequences. Some of the gates that were not activated during the initial minor frame in the subcommutated sequences are activated during the following minor frame. In contrast, none of the gates in matrix 50 associated with subcommutated sequences which were activated during the initial minor frame are activated during the next succeeding minor frame; this is a reason for the nomenclature "subcommutated sequence."

Consideration is now given to some of the operations performed during the second minor frame, that is, the minor frame immediately following the initial minor frame.

At memory location 13, a command 7, for selectively establishing synchronism between the memory sequence 34 and subsystem 20, is indicated. Since the 0 scratch pad memory still has a count of zero therein from the last minor frame, flip-flop 364 remains activated to the set state and a binary one level is derived on the Q output thereof. In response to the binary one Q output of flip-flop 348, the binary one level on lead 307 and the B2, C3 timing signals, flip-flop 364 is reset by the binary one output of flip-flop 364. If synchronism prevails between sequencer 34 and subsystem 20, the sync preset signal is derived immediately after the sync word at memory address 15 was loaded into input-output register 76 to set flip-flop 364 and the next fetch operation from memory address 16 is commenced. The operation is commenced from address 16 since instruction counter 88 is incremented by two counts in response to the command 7 operation. If, however, the sync preset pulse is not derived flip-flop 364 remains in the reset state so that the next fetch operation cannot start and will not start until the next sync preset pulse occurs. At that time, the operation commences in exactly the same manner as just previously indicated, whereby synchronism between sequencer 34 and subsystem 20 is achieved.

The system functions in response to the commands at memory locations 14–20 in exactly the same manner as described supra with regard to the initial minor frame of a major frame. In response to instruction counter 88 being activated so that the word in memory address 21 is read out, a command 3, scratch pad counter 0 sequence is again initiated. The first command 3, scratch pad counter 0 operation is to reset flip-flop 348 in response to the output of AND gate 350 so that flip-flop 326 can be reset in response to the comparison signal later in the command 3, counter 0 sequence. During the comparison operation the count of zero in scratch pad counter 0 is compared with the maximum minor frame count limit of 79, as stored at memory location 22, whereby flip-flop 326 provides an indication that the maximum count has not been reached or exceeded.

In response to the comparison signal having a value indicating that the word stored in scratch pad counter 0 has a magnitude less than the limit value of 79 stored at memory address 21, the scratch pad counter is incremented from a zero to a one count and a count of one is read from input-output register 76 into the eight least significant bit stages of buffer register 40. In response to the count of 00000001 being read from input-output register 76, NAND gate 340 derives a binary zero output so that flip-flop 348 remains in the reset state. Thereby, flip-flop 348 enables flip-flop 326 to be responsive to the comparison signal derived from matrix 112 during each of the remaining words of the minor frame under consideration. Flip-flop 326 remains responsive to the comparison signal until the next initial minor frame in a major frame is reached, at which time flip-flop 348 is again activated to the set state and flip-flop 326 is slaved thereto.

The operation continues for memory addresses 24–32 in exactly the same manner as it proceeded for these memory addresses during the first or initial minor frame. In response to memory address 33 being reached, a command 3 and scratch pad counter 1 are designated. By the time memory address 33 is reached, scratch pad counter 1 stores a signal specifying activation of gate 35 because of the command 2, scratch pad memory 1 designations at memory addresses 40 and 48 which were read out during the initial minor frame. In response to the command 3 and scratch pad counter 1 storing a signal indicative of activation of gate 35, formatter 38 is energized so that the signal source connected to gate 35 is sampled. The remaining addresses containing commands 3 are activated during the second minor frame in exactly the same maner as indicated with regard to the word at memory location 33. Similarly, the addresses with a command 2 are activated in exactly the same manner as indicated supra with regard to the initial minor frame.

In response to memory sequencer 34 reaching memory location 84, a command 5 is again retrieved from memory with the designation that scratch pad counter 3 is to be utilized. Scratch pad counter 3 is now activated to instruct the memory sequencer to read the data word at memory location 109, commanding activation of gate 591 in matrix 50, to input-output register 76 for readout to formatter 38. Prior to the readout of register 76, scratch pad memory 3 is advanced so that it stores a count indicative of the memory location 111, which location is read out during the third minor frame in the major frame being considered.

The system operates during the next three minor frames in exactly the same manner as it operates during the second minor frame. During the sixth minor frame, however, a deviation in the operation of the system occurs in response to interrogation of memory location 33. When memory location 33 has been reached during the sixth minor frame, scratch pad counter 1 is storing a signal indicative of the count 46, equal to the limit value for scratch pad counter 1, stored in the word at memory location 34. In response to the count stored in scratch pad counter reaching the value stored at memory location 34, a binary one signal is derived from comparison matrix 112 to activate memory sequencer 34 so that the lower limit value in the sequential subcommutated sequence associated with scratch pad counter 1 is loaded into input-output register 76 and scratch pad counter 1. Thereby, the cycle of operations in reading the sequentially numbered gates 32–46 is reinitiated in response to the sixth minor frame reaching memory location 33.

From the foregoing, it may be seen that a relatively limited memory can be utilized for selectively sampling many different data sources at variable frequencies, which may be submultiples of a basic minor frame frequency. With the specific program of Table 2, only 112 memory addresses are required to generate a nonrepetitive major frame including 6400 words.

While there has been described and illustrated one specific embodiment of the invention, it will be clear that variations in the details of the embodiment specifically illustrated and described may be made without departing from the true spirit and scope of the invention as defined in the appended claims.

We claim:

1. A system for telemetering data from a plurality of sources comprising a plurality of switches, at least some of said switches being responsive to different ones of said sources, means for feeding a signal derived from each of said switches to an output, a programmable memory storing a multiplicity of data words, at least some of said data words being coded to enable said switches to be individually activated, means for activating said memory to retrieve said coded data words in sequence, means for enabling said switches to pass signals from said sources in response to the retrieved data words, means for reprogramming at least a portion of said memory, and means for feeding retrieved coded data words to said output in place of signals derived from said switches.

2. The system of claim 1 including means for reading the contents of said memory in response to termination of the memory being reprogrammed.

3. The system of claim 1 including means for selectively feeding each of said multiplicity of data words from the memory to the output in place of the signals derived from said switches.

4. The system of claim 1 wherein said memory stores a plurality of programs for deriving different sequences of said coded data words, and means for selectively activating said memory to read out one of said sequences.

5. The system of claim 1 further including means for terminating the retrieval of said coded data words in response to the sequential retrieval of said data words and a clock signal being out of synchronism and for reinitiating the sequential retrieval of said data words in response to the clock signal.

6. The system of claim 1 wherein said memory stores a plurality of programs for deriving different sequences of said coded data words, and means for selectively activating said memory to read out one of said sequences.

7. The system of claim 6 further including means for terminating the retrieval of said coded data words in response to the sequential retrieval of said data words and a clock signal being out of synchronism and for reinitiating the sequential retrieval of said data words in response to the clock signal.

8. A system for telemetering data from a plurality of sources comprising a plurality of switches, at least some of said switches being responsive to different ones of said sources, means for feeding a signal derived from each of said switches to an output, a programmable memory storing a multiplicity of data words, at least some of said data words being coded to enable said switches to be individually activated, means for activating said memory to retrieve said coded data words in sequence, means for enabling said switches to pass signals from said sources in response to the retrieved data words, means for reprogramming at least a portion of said memory, and control means for periodically sequencing said memory through a complete readout cycle at a predetermined frequency, and means for retrieving certain of said coded data words at a frequency subharmonically related to said predetermined frequency.

9. The system of claim 8 wherein said control means includes means for enabling some of said switches in said subharmonic predetermined order at a frequency in response to retrieval of said certain data words.

10. The system of claim 8 wherein said control means includes means for retrieving memory words controlling the enabling of some of said switches from a set of memory addresses having a predetermined order.

11. The system of claim 1 including means for selectively feeding each of said multiplicity of data words from the memory to the output in place of the signals derived from said switches.

12. The system of claim 11 further including means for feeding said retrieved coded data words to said output in place of the signals derived from said switches.

13. The system of claim 11 wherein said memory stores a plurality of programs for deriving different sequences of said coded data words, and means for selectively activating said memory to read out one of said sequences.

14. The system of claim 11 further including means for terminating the retrieval of said coded data words in response to the sequential retrieval of said data words and a clock signal being out of synchronism and for reinitiating the sequential retrieval of said data words in response to the clock signal.

15. The system of claim 11 further including control means for periodically sequencing said memory through a complete readout cycle at a predetermined frequency, and means for retrieving certain of said coded data words with a frequency less than said predetermined frequency.

16. A system for telemetering data from a plurality of sources comprising a plurality of switches, at least some of said switches being responsive to different ones of said sources, means for feeding a signal derived from each of said switches to an output, a programmable memory storing a multiplicity of data words, at least some of said data words being coded to enable said switches to be individually activated, means for activating said memory to retrieve said coded data words in sequence, means for enabling said switches to pass signals from said sources in response to the retrieved data words, and means for feeding said retrieved coded data words to said output in place of the signals derived from said switches.

17. The system of claim 16 wherein said memory stores a plurality of programs for deriving different sequences of said coded data words, and means for selectively activating said memory to read out one of said sequences.

18. The system of claim 16 further including means for terminating the retrieval of said coded data words in response to the sequential retrieval of said data words and a clock signal being out of synchronism and for reinitiating the sequential retrieval of said data words in response to the clock signal.

19. The system of claim 16 further including control means for periodically sequencing said memory through a complete readout cycle at a predetermined frequency, and means for retrieving certain of said coded data words with a frequency less than said predetermined frequency.

20. A system for telemetering data from a plurality of sources comprising a plurality of switches, at least some of said switches being responsive to different ones of said sources, means for feeding a signal derived from each of said switches to an output, a programmable memory storing a multiplicity of data words, at least some of said data words being coded to enable said switches to be individually activated, means for activating said memory to retrieve said coded data words in sequence, means for enabling said switches to pass signals from said sources in response to the retrieved data words, control means for periodically sequencing said memory through a complete readout cycle at a predetermined frequency, and means for retrieving certain of said coded data words at a frequency subharmonically related to said predetermined frequency.

21. The system of claim 20 wherein said control means includes means for enabling some of said switches in a predetermined order at said subharmonic frequency in response to retrieval of said certain data words.

22. The system of claim 20 wherein said control means includes counter means for controlling the enabling of said some of said switches, means for setting said counter means to a first limit value, means for advancing the count of said counter means in response to each enabling of said some of said switches in the predetermined order, and means for resetting said counter means to the first limit in response to the count of the counter means exceeding a second limit.

23. The system of claim 22 wherein said first and second limits are stored at first and second predetermined memory addresses and said control means includes means responsive to one of said certain coded data words to compare the count of said counter means with said second limit, means responsive to the count of said counter means being less than the second limit for advancing the count, and means for resetting the count of the counter means to said first limit in response to the count being equal to or greater than the second limit.

24. The system of claim 2 wherein said control means includes means for enabling said some of said switches in an arbitrary order at a frequency less than said predetermined frequency.

25. The system of claim 24 wherein said control means includes means for retrieving memory words controlling the enabling of said some of said switches from a set of memory addresses having a predetermined order.

26. The system of claim 25 wherein said control means includes counter means for controlling the readout of said set of memory addresses.

27. The system of claim 26 wherein said control means further includes means for setting said counter means to a first limit value, means for advancing the count of said counter means in response to each readout of one of the memory addresses in the set, and means for resetting said counter means to the first limit in response to the count of the counter means exceeding a second limit.

28. The system of claim 20 wherein said control means responds to said certain coded data words to enable some of said switches at said subharmonic frequency in response to retrieval of said certain data words.

29. The system of claim 28 wherein said control means includes means for enabling a first group of said some of said switches in a predetermined order and for enabling a second group of said some of said switches in an arbitrary order.

30. The system of claim 29 wherein said control means includes first and second counter means for respectively controlling the enabling of said first group of switches and the retrieval of memory words controlling the enabling of said second group of switches from a set of memory addresses having a predetermined order.

31. The system of claim 30 wherein said control means includes first and second counter means for respectively controlling the enabling of said first group of switches and the retrieval of memory words controlling the enabling of said second group of switches from a set of memory addresses having a predetermined order, and further including means for setting said counter means to one of said limits in response to said memory means being activated through a predetermined number of said sequences.

32. A system for telemetering data from a plurality of sources comprising a plurality of switches, at least some of said switches being responsive to different ones of said sources, means for feeding a signal derived from each of said switches to an output, a programmable memory storing a multiplicity of data words, at least some of said data words being coded to enable said switches to be individually activated, means for activating said memory to retrieve said coded data words in sequence, means for enabling said switches to pass signals from said sources in response to the retrieved data words, wherein said activating means comprises a counter for storing data indicative of a memory address to be read out or to have data loaded therein, a register for temporarily storing data retrieved from said memory, means responsive to data words retrieved from said memory for deriving command signals in response to data bits in the retrieved words, and means for selectively interconnecting said counter and register with said memory in response to said command signals.

33. The system of claim 32 further including means for selectively feeding data words into said memory in response to a comparison of the count in said register with the count of data words retrieved from said memory and said command signals.

34. The system of claim 32 further including means for deriving signals to control reloading of said memory, and means for selectively interconnecting said counter and register with said memory in response to said reloading control signals.

35. A system for telemetering data from a plurality of sources comprising a plurality of switches, at least some of said switches being responsive to a different one of said sources, means for feeding a signal derived from each of said switches to an output, memory means, means for repetitively activating said memory means through a sequence of addresses at a first frequency having a predetermined period, means responsive to data derived from some of said addresses for enabling some of said switches at least once during each of said periods, and control means responsive to data derived from others of said addresses for enabling others of said switches at a frequency subharmonically related to said frequency.

36. The system of claim 35 wherein said control means includes means for enabling said other switches in a predetermined order.

37. The system of claim 36 wherein said control means includes counter means for controlling the enabling of said other switches, means for setting said counter means to a first limit value, means for advancing the count of said counter means in response to each enabling of said switches in the predetermined order, and means for resetting said counter means to the first limit in response to the count of the counter means exceeding a second limit.

38. The system of claim 37 wherein said first and second limits are stored at first and second predetermined memory addresses and said control means includes means responsive to a data word at one of said other addresses to compare the count of said counter means with said second limit, means responsive to the count of said counter means being less than the second limit for advancing the count, and means for resetting the count of the counter means to said first limit in response to the count being equal to or greater than the second limit.

39. The system of claim 37 further including means for setting said counter means to one of said limits in response to said memory means being activated through a predetermined number of said sequences.

40. The system of claim 35 wherein said control means includes means for enabling said other switches in an arbitrary order.

41. The system of claim 40 wherein said control means includes means for retrieving memory words controlling the enabling of said other switches from a set of memory addresses having a predetermined order.

42. The system of claim 41 wherein said control means includes counter means for controlling the readout of said set of memory addresses.

43. The system of claim 42 wherein said control means further includes means for setting said counter means to a first limit value, means for advancing the count of said counter means in response to each readout of one of the memory addresses in the set, and means for resetting said counter means to the first limit in response to the count of the counter means exceeding a second limit.

44. The system of claim 35 wherein said memory stores a plurality of programs for deriving different sequences of said coded data words, and means for selectively activating said memory to read out one of said sequences.

45. The system of claim 35 wherein said control means includes means for enabling a first group of said other switches in a predetermined order and for enabling a second group of said other switches in an arbitrary order.

46. The system of claim 45 wherein said control means includes first and second counter means for respectively controlling the enabling of said first group of switches and the retrieval of memory words controlling the enabling of said second group of switches from a set of memory addresses having a predetermined order.

47. The system of claim 46 wherein said control means includes first and second counter means for respectively controlling the enabling of said first group of switches and the retrieval of memory words controlling the enabling of said second group of switches from a set of memory addresses having a predetermined order, and further including means for setting said counter means to one of said limits in response to said memory means being activated through a predetermined number of said sequences.

48. The system of claim 35 wherein said activating means comprises a counter for storing data indicative of a memory address to be read out or to have data loaded therein, a register for temporarily storing data retrieved from said memory, means responsive to data words retrieved from said memory for deriving command signals in response to data bits in the retrieved words, and means for selectively interconnecting said counter and register with said memory in response to said command signals.

49. The system of claim 48 further including means for selectively feeding data words into said memory in response to a comparison of the count in said register with the count of data words retrieved from said memory and said command signals.

References Cited

UNITED STATES PATENTS

| | | | |
|---|---|---|---|
| 3,344,406 | 9/1967 | Vinal. | |
| 3,440,614 | 4/1969 | Pagel | 340—172.5 |
| 3,353,162 | 11/1967 | Richard et al. | 340—172.5 |

GARETH D. SHAW, Primary Examiner

U.S. Cl. X.R.

340—150